United States Patent
Kelly et al.

(10) Patent No.: US 7,949,624 B2
(45) Date of Patent: May 24, 2011

(54) APPARATUS AND METHOD FOR HIERARCHICAL DECOMPOSITION OF PLANNING, SCHEDULING, AND OTHER DECISION-MAKING PROBLEMS

(75) Inventors: Jeffrey D. Kelly, Scarborough (CA); Danielle Zyngier, Bolton (CA)

(73) Assignee: Honeywell International Inc., Morristown, NJ (US)

( * ) Notice: Subject to any disclaimer, the term of this patent is extended or adjusted under 35 U.S.C. 154(b) by 715 days.

(21) Appl. No.: 12/037,574

(22) Filed: Feb. 26, 2008

(65) Prior Publication Data
US 2009/0216699 A1 Aug. 27, 2009

(51) Int. Cl.
*G06F 17/00* (2006.01)
*G06N 5/02* (2006.01)
(52) U.S. Cl. .................................................. 706/46
(58) Field of Classification Search ............... 706/46
See application file for complete search history.

(56) References Cited

U.S. PATENT DOCUMENTS

| | | | |
|---|---|---|---|
| 6,865,609 B1* | 3/2005 | Gubbi et al. | 709/230 |
| 7,389,350 B2* | 6/2008 | Charters et al. | 709/227 |
| 7,409,378 B2* | 8/2008 | Castellani et al. | 706/62 |
| 7,454,400 B2* | 11/2008 | Andreoli et al. | 706/62 |
| 7,698,218 B1* | 4/2010 | Opaluch et al. | 705/40 |
| 7,716,180 B2* | 5/2010 | Vermeulen et al. | 707/626 |
| 7,739,239 B1* | 6/2010 | Cormie et al. | 707/626 |
| 7,778,972 B1* | 8/2010 | Cormie et al. | 707/626 |
| 7,792,699 B2* | 9/2010 | Kwei | 705/26.4 |
| 7,848,966 B2* | 12/2010 | Charuk et al. | 705/26.8 |

OTHER PUBLICATIONS

Delay efficient sleep scheduling in wireless sensor networks, Lu, G.; Sadagopan, N.; Krishnamachari, B.; Goel, A.; INFOCOM 2005. 24th Annual Joint Conference of the IEEE Computer and Communications Societies. Proceedings IEEE vol. 4 Digital Object Identifier: 10.1109/INFCOM.2005.1498532 Publication Year: 2005 , pp. 2470-2481 vol. 4.*

Learning and mathematical reasoning using adaptive signal processing techniques, Mirzai, A.R.; Cowan, C.F.N.; Crawford, T.M.; Application of Artificial Intelligence Techniques to Signal Processing , IEE Colloquium on Publication Year: 1989 , pp. 2/1-2/4.*

A game theoretic analysis of service competition and pricing in heterogeneous wireless access networks, Niyato, D.; Hossain, E.; Wireless Communications, IEEE Transactions on vol. 7 , Issue: 12 , Part: 2 Digital Object Identifier: 10.1109/T-WC.2008.070609 Publication Year: 2008 , pp. 5150-5155.*

(Continued)

*Primary Examiner* — Michael Holmes
(74) *Attorney, Agent, or Firm* — Munck Carter, LLP

(57) ABSTRACT

A system includes a coordinator configured to generate a first offer representing a possible solution to a problem being solved. The coordinator is configured to generate the first offer using a first model. The system also includes multiple cooperators each configured to receive the first offer and to determine if a sub-problem associated with the problem can be solved based on the first offer and using a second model. Each cooperator is also configured to identify an infeasibility and communicate the infeasibility to the coordinator when the sub-problem cannot be solved based on the first offer. The coordinator is further configured to receive the infeasibility, generate a second offer by reducing a deviation between the first offer and a consensus of the cooperators, and provide the second offer to the cooperators. The consensus of the cooperators is based on a level of the first offer that each cooperator can achieve.

20 Claims, 14 Drawing Sheets

OTHER PUBLICATIONS

LCCF: A scheduling algorithm for asynchronous optical switches, Xin Li; Zhen Zhou; Hamdi, M.; High Performance Switching and Routing, 2005. HPSR. 2005 Workshop on Digital Object Identifier: 10.1109/HPSR.2005.1503198 Publication Year: 2005, pp. 78-82.*

Jeffrey D. Kelly et al., "Apparatus and Method for Order Generation and Management to Facilitate Solutions of Decision-Making Problems", U.S. Appl. No. 12/044,639, filed Mar. 7, 2008.

Jeffrey D. Kelly et al., "Hierarchical decomposition heuristic for scheduling: Coordinated reasoning for decentralized and distributed decision-making problems", Computers & Chemical Engineering, 2007, 22 pages.

Jeffrey D. Kelly, "The Unit-Operation-Stock Superstructure (UOSS) and the Quantity-Logic-Quality Paradigm (QLQP) for Production Scheduling in the Process Industries", MISTA 2005 Conference, New York City, Jul. 18 to 21, 2005, 7 pages.

Jeffrey D. Kelly, "Modeling Production-Chain Information", Information Technology, www.cepmagazine.org, Feb. 2005, pp. 28-31.

"Production Scheduler" Engineering Guide, Honeywell, Feb. 2008, 53 pages.

Robert Fourer et al., "Optimization Services 1.0 User's Manual", Jan. 16, 2008, 77 pages.

Jeffrey D. Kelly et al., "A Projectional Model of Data for Complexity Management of Enterprise-Wide Optimization Models", Honeywell Process Solutions, 2007, 42 pages.

Matthew H. Bassett et al., "Decomposition Techniques for the Solution of Large-Scale Scheduling Problems", Process Systems Engineering, AIChE Journal, vol. 42, No. 12, Dec. 1996, pp. 3373-3387.

R. Cheng et al., "Price-driven coordination method for solving plant-wide MPC problems", Journal of Process Control, 2006, 10 pages.

George B. Dantzig et al., "Decomposition Principle for Linear Programs", Nov. 24, 1959, pp. 101-111.

Muge Erdirik Dogan et al., "A Decomposition Method for the Simultaneous Planning and Scheduling of Single-Stage Continuous Multiproduct Plants", Ind. Eng. Chem. Res., 2006, pp. 299-315.

J. Fraser Forbes et al., "Model Accuracy for Economic Optimizing Controllers: The Bias Update Case", Ind. Eng. Chem. Res., 1994, pp. 1919-1929.

A. .M. Geoffrion, "Generalized Benders Decomposition", Journal of Optimization Theory and Applications, vol. 10, No. 4, 1972, pp. 237-260.

Kurt Jornsten et al., "Decomposition and iterative aggregation in hierarchical and decentralised planning structures", European Journal of Operational Research, 1995, pp. 120-141.

Rinaldo A. Jose et al., "Pricing Interprocess Streams Using Slack Auctions", AIChE Journal, 1999, pp. 1-53.

Ramkumar Karuppiah et al., "A Lagrangean based Branch-and-Cut algorithm for global optimization of nonconvex Mixed-Integer Nonlinear Programs with decomposable structures", Department of Chemical Engineering, Carnegie Mellon University, Jul. 2006, pp. 1-33.

Jeffrey D. Kelly, "Chronological Decomposition Heuristic for Scheduling: Divide and Conquer Method", AIChE Journal, vol. 48, No. 12, Dec. 2002, pp. 2995-2999.

Jeffrey D. Kelly, "Production Modeling for Multimodal Operations", Information Technology, www.cepmagazine.org, Feb. 2004, pp. 44-46.

Jeffrey D. Kelly, "Stock Decomposition Heuristic for Scheduling: A Priority Dispatch Rule Approach", Aug. 2004, 16 pages.

J. D. Kelly, "Logistics: The missing link in blend scheduling optimization", Hydrocarbon Processing, Jun. 2006, pp. 1-5.

Jeffrey D. Kelly et al., "Flowsheet decomposition heuristic for scheduling: A relax-and-fit method", Computers & Chemical Engineering, 2004, pp. 1-8.

Joseph Z. Lu, "Challenging control problems and emerging technologies in enterprise optimization", Control Engineering Practice, 2003, pp. 847-858.

Dan Wu et al., "Decomposition approaches for the efficient solution of short-term scheduling problems", Computers & Chemical Engineering, 2003, pp. 1261-1276.

N. Zhang et al., "Novel modelling and decomposition strategy for total site optimisation", Computers & Chemical Engineering, 2006, pp. 765-777.

Rinaldo A. Jose et al., "Auction-Driven Coordination for Plantwide Optimization", 1998, 6 pages.

Danielle Zyngier et al., "Multi-Product Inventory Logistics Modeling in the Process Industries", 2007, 35 pages.

Stephen J. Wilkinson, "Aggregate Formulations for Large-Scale Process Scheduling Problems", a Thesis submitted for the degree of Doctor of Philosophy of the University of London and for the Diploma of Membership of the Imperial College, Mar. 1996, 175 pages.

Danielle Zyngier, "Monitoring, Diagnosing and Enhancing the Performance of Linear Closed-Loop Real-Time Optimization Systems", a Thesis Submitted to the School of Graduate Studies in Partial Fulfillment of the Requirements for the Degree, Sep. 2006, 219 pages.

Rinaldo A. Jose, "On the Optimal Coordination of Profit Maximizing Divisions Using Auctions and Price Theory", Nov. 6, 1999, 246 pages.

* cited by examiner

APPARATUS AND METHOD FOR HIERARCHICAL DECOMPOSITION OF PLANNING, SCHEDULING, AND OTHER DECISION-MAKING PROBLEMS

TECHNICAL FIELD

This disclosure relates generally to planning, scheduling, and other decision-making systems. More specifically, this disclosure relates to an apparatus and method for hierarchical decomposition of planning, scheduling, and other decision-making problems.

BACKGROUND

Processing facilities and other entities are often required to perform planning and scheduling operations. Planning and scheduling typically involve sizing, sequencing, assignment, and timing decisions so that ideally specified due-dates and deadlines are satisfied. For example, planning may involve determining a quantity of product to be produced by a specific deadline, while scheduling may involve determining how that product will be produced over time. Many prior approaches have involved the identification of globally optimal solutions to the integration of planning and scheduling problems. However, finding globally optimal solutions is often a complex, computationally intensive, and lengthy task. Also, some of these approaches require excessively restrictive assumptions in order to generate globally optimal solutions.

SUMMARY

This disclosure provides an apparatus and method for hierarchical decomposition of planning, scheduling, and other decision-making problems.

In a first embodiment, a system includes a coordinator configured to generate a first offer representing a possible solution to a problem being solved. The coordinator is configured to generate the first offer using a first model. The system also includes multiple cooperators each configured to receive the first offer and to determine if a sub-problem associated with the problem can be solved based on the first offer and using a second model. Each cooperator is also configured to identify an infeasibility and communicate the infeasibility to the coordinator when the sub-problem cannot be solved based on the first offer. The coordinator is further configured to receive the infeasibility, generate a second offer by reducing a deviation between the first offer and a consensus of the cooperators, and provide the second offer to the cooperators. The consensus of the cooperators is based on a level of the first offer that each cooperator can achieve.

In a second embodiment, a method includes generating a first offer representing a possible solution to a problem being solved and communicating the first offer to multiple cooperators. The method also includes receiving an infeasibility from at least one of the cooperators, where the infeasibility identifies that the cooperator cannot solve a sub-problem based on the first offer. The method further includes generating a second offer by reducing a deviation between the first offer and a consensus of the cooperators, where the consensus of the cooperators is based on a level of the first offer that each cooperator can achieve. In addition, the method includes communicating the second offer to the cooperators.

In a third embodiment, a method includes receiving, from a coordinator at one of multiple cooperators, a first offer representing a possible solution to a problem being solved. The method also includes determining if a sub-problem associated with the problem can be solved based on the first offer. The method further includes identifying an infeasibility, where the infeasibility indicates that the sub-problem cannot be solved based on the first offer. In addition, the method includes communicating the infeasibility to the coordinator and receiving a second offer from the coordinator. The second offer reduces a deviation between the first offer and a consensus of the cooperators, where the consensus of the cooperators is based on a level of the first offer that each cooperator can achieve.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 17, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

This disclosure generally presents an approach for decomposing and rationalizing large decision-making problems into a common and consistent framework. This approach may be referred to as a hierarchical decomposition heuristic ("HDH"), which attempts to obtain one or more "globally feasible" solutions to an overall problem. The hierarchical decomposition heuristic could be implemented in any suitable manner, such as in a standalone tool or as part of a device or system that performs other functions. The hierarchical decomposition heuristic could also be used in any suitable situation, such as when it is used to manage a decentralized and distributed system where globally consistent solutions are needed. It could further be used as part of a larger decision-making system, such as when it is used to determine the lower bound of a maximization problem within a global optimization strategy (such as a Lagrangean decomposition). Example uses of the hierarchical decomposition heuristic are provided below in the context of industrial settings, such as for solving industrial-scale scheduling problems. This is for illustration only. The hierarchical decomposition heuristic could be used in a wide range of industries, and it could be used to solve a wide variety of different problems.

Figure 1:
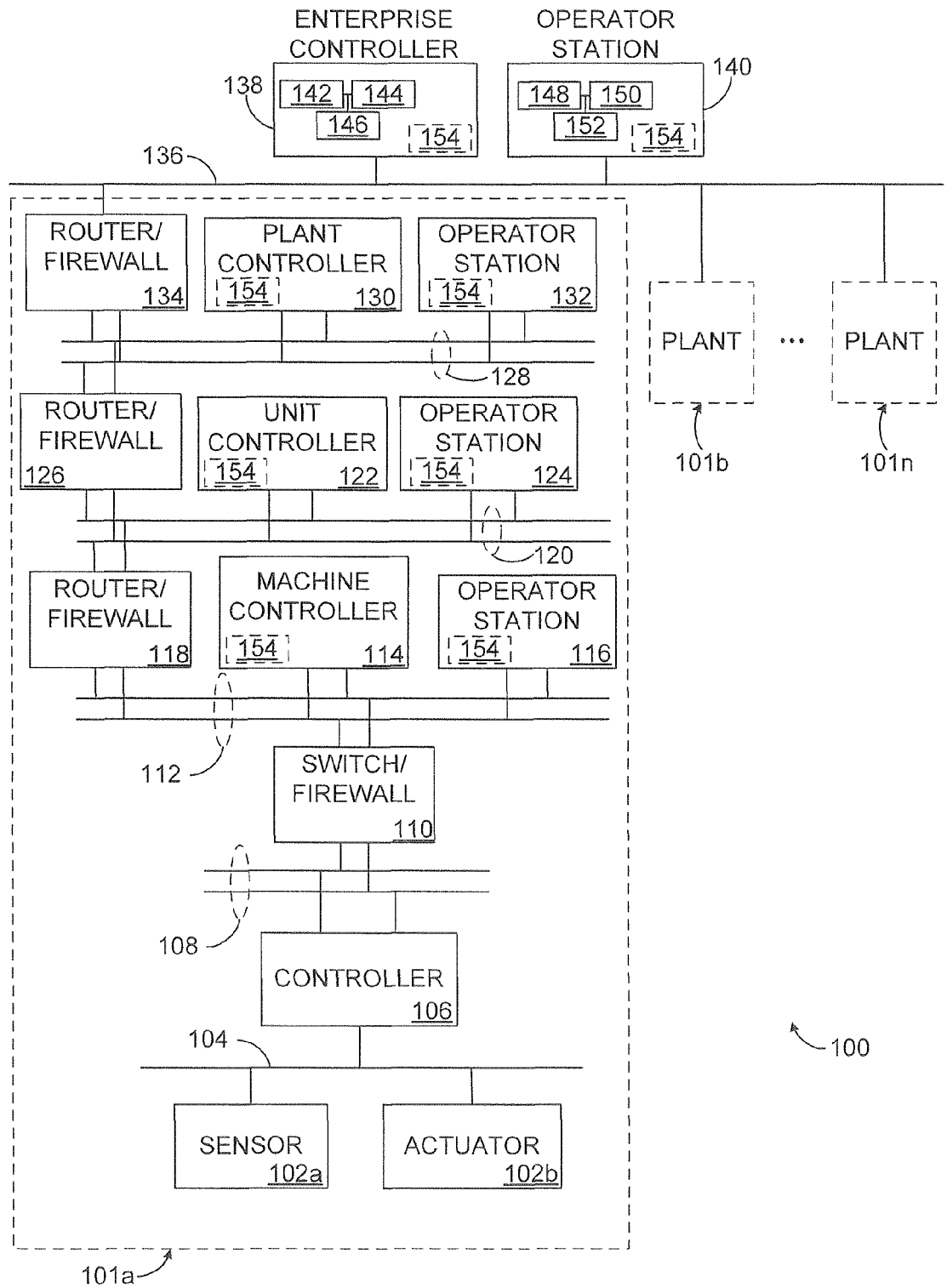
FIG. 1 illustrates an example process control system according to this disclosure.

FIG. 1 illustrates an example process control system 100 according to this disclosure. The embodiment of the process control system 100 shown in FIG. 1 is for illustration only. Other embodiments of the process control system 100 may be used without departing from the scope of this disclosure.

In this example embodiment, the process control system 100 includes various components that facilitate production or processing of at least one product or other material. For instance, the process control system 100 is used here to facilitate control over components in multiple plants 101a-101n. The plants 101a-101n represent one or more processing facilities (or portions of thereof), such as one or more manufacturing facilities for producing at least one product or other material. In general, each plant 101a-101n may implement one or more processes and can individually or collectively be referred to as a process system. A process system may generally represent any system or portion thereof configured to process one or more products or other materials in some manner.

In FIG. 1, the process control system 100 is implemented using the Purdue model of process control. In this model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system, such as heaters, motors, or valves. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any hardware, software, firmware, or combination thereof for interacting with one or more sensors 102a and controlling one or more actuators 102b. Each controller 106 could, for example, represent a multivariable controller, such as a Robust Multivariable Predictive Control Technology (RMPCT) controller or other type of controller. As a particular example, each controller 106 could represent a computing device running a MICROSOFT WINDOWS operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any hardware, software, firmware, or combination thereof for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any hardware, software, firmware, or combination thereof for supporting user access and control of the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any hardware, software, firmware, or combination thereof for providing access to, control of, or operations related to multiple machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any hardware, software, firmware, or combination thereof for supporting user access and control of the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As a particular example, the plant-level controller 130 could execute one or more manufacturing execution system (MES) applications, scheduling applications, or other or additional plant or process control applications. Each of the plant-level controllers 130 includes any hardware, software, firmware, or combination thereof for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any hardware, software, firmware, or combination thereof for supporting user access and control of the system 100. Each of the operator stations 132 could, for example, represent a computing device running a MICROSOFT WINDOWS operating system.

At least one router/firewall 134 couples the networks 128 to one or more networks 136. The router/firewall 126 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for the plants 101a-101n and to control various aspects of the plants 101a-101n. The enterprise-level controllers 138 perform various functions to support the operation and control of components in the plants 101a-101n. As a particular example, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any hardware, software, firmware, or combination thereof for providing access to, control of, or operations related to the control of multiple plants. Each of the enterprise-level controllers 138 could, for example, represent a server computing device running a MICROSOFT WINDOWS operating system.

Access to the enterprise-level controllers 138 may be provided by one or more operator stations 140. Each of the operator stations 140 includes any hardware, software, firmware, or combination thereof for supporting user access and control of the system 100. Each of the operator stations 140 could, for example, represent a computing device running a MICROSOFT WINDOWS operating system.

In particular embodiments, the various controllers and operator stations in FIG. 1 may represent computing devices. For example, each of the controllers could include one or more processors 142 and one or more memories 144 for storing instructions and data used, generated, or collected by the processor(s) 142. Each of the servers could also include at least one network interface 146, such as one or more Ethernet interfaces. Also, each of the operator stations could include one or more processors 148 and one or more memories 150 for storing instructions and data used, generated, or collected by the processor(s) 148. Each of the operator stations could also include at least one network interface 152, such as one or more Ethernet interfaces.

In one aspect of operation, various complex decision-making problems may need to occur in various portions of the process control system 100 (or throughout the entire process control system 100). For example, planning and scheduling operations may need to be performed by the enterprise-level controllers 138, the plant-level controllers 130, or by any other controllers in the process control system 100. As another example, process control performed by various controllers in the process control system 100 (such as in the first three levels) could involve complex control decisions (such as those involved in process optimization and control). As a third example, planning operations can be performed by the enterprise-level controllers 138 for the entire enterprise, and the plant-level controllers 130 can perform planning operations for the individual plants.

To support finding solutions for these or other complex decision-making problems, one or more components in the process control system 100 include a hierarchical decomposition heuristic (HDH) application 154. The HDH application 154 could represent different functions in different components of the system 100. For example, as described in more detail below, problems to be solved can be decomposed into coordination and cooperation/collaboration elements. The HDH application 154 in higher-level components could implement the coordination elements, while the HDH application 154 in lower-level components could implement the cooperation/collaboration elements. In this way, the HDH application 154 supports the use of decomposition as a way of dealing with large or complex problems to be solved. Additional details regarding the HDH application 154 are provided below. The HDH application 154 includes any suitable hardware, software, firmware, or combination thereof for performing one or more functions related to identifying a solution for a decomposed problem to be solved.

Although FIG. 1 illustrates one example of a process control system 100, various changes may be made to FIG. 1. For example, a control system could include any number of sensors, actuators, controllers, servers, operator stations, networks, and HDH or other applications. Also, the makeup and arrangement of the process control system 100 in FIG. 1 is for illustration only. Components could be added, omitted, combined, or placed in any other suitable configuration according to particular needs. In addition, FIG. 1 illustrates one operational environment in which problem decomposition can be used. This functionality could be used in any other suitable device or system (whether or not related to process control).

FIGS. 2A through 18 illustrate an example technique for hierarchical decomposition of planning, scheduling, and other decision-making problems according to this disclosure. The embodiment of the hierarchical decomposition technique shown in FIGS. 2A through 18 is for illustration only. Other embodiments of the hierarchical decomposition technique could be used without departing from the scope of this disclosure.

Figure 2A:
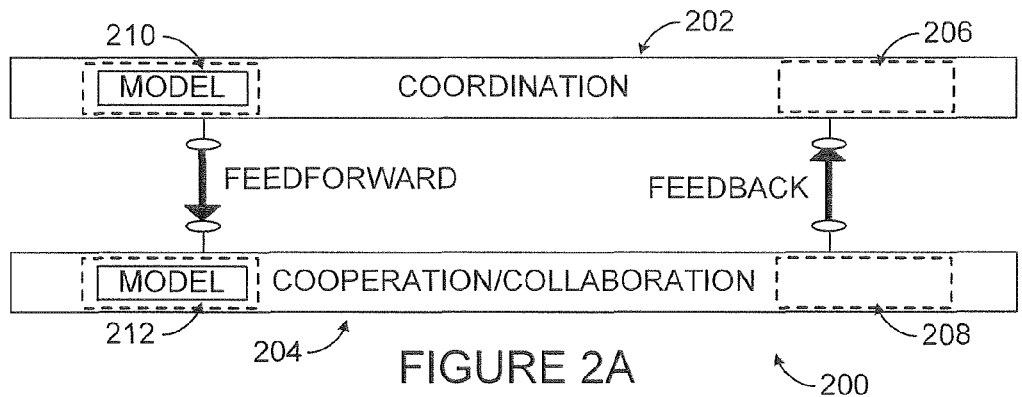
FIGS. 2A through 18 illustrate an example technique for hierarchical decomposition of planning, scheduling, and other decision-making problems according to this disclosure.

A complex problem to be solved can often be decomposed into a hierarchical decomposition 200, an example of which is shown in FIG. 2A. In general, the hierarchical decomposition 200 can be used to represent decision-making systems for solving complex problems, such as planning and scheduling problems. In this example, the hierarchical decomposition 200 includes a coordination layer 202 and a cooperation/collaboration layer 204. The term "cooperation" can be used with respect to layer 204 when the elements in the layer 204 do not have any knowledge of each other, such as when the elements are fully separable from the perspective of information. The term "collaboration" can be used with respect to layer 204 when the elements in the layer 204 can exchange at least some information relevant to the problem being solved. The HDH application 154 can be executed in various components in the process control system 100, and these components could implement the coordination layer 202 and the cooperation/collaboration layer 204 shown in FIG. 2A. In this way, the HDH application 154 can support complex problem-solving in the system 100.

The coordination layer 202 in the hierarchical decomposition 200 may be generally responsible for higher-level functions when solving a problem, while the cooperation/collaboration layer 204 may be generally responsible for lower-level functions when solving the problem. More specifically, the cooperation/collaboration layer 204 generally includes various components (each of which can solve a portion of the problem), and the coordination layer 202 helps to coordinate the operation of the cooperation/collaboration layer 204 so that all components in the layer 204 find a feasible solution to the problem. For example, when performing various planning and scheduling operations, the coordination layer 202 could be used to identify a quantity of a product to be produced and to generate an initial schedule for the production of the product. The cooperation/collaboration layer 204 could be used to schedule operations at multiple production plants in view of the schedule produced by the coordination layer 202. In other words, the cooperation/collaboration layer 204 could be used to determine whether feasible schedules for producing the product can be generated in view of the initial schedule produced by the coordination layer 202. If so, a "globally feasible" solution (the schedules for the production plants) has been found for the problem (the planning and scheduling problem).

In the discussion that follows, components in the coordination layer 202 may be generally referred to as coordinators 206, and components in the cooperation/collaboration layer 204 may be generally referred to as cooperators 208. The HDH application 154 in the same or different devices can implement the coordinators 206 and/or the cooperators 208 needed to solve a particular problem. Also, various components in the process control system 100 could implement various coordinators 206 and cooperators 208, allowing these components to engage in distributed reasoning to solve a planning and scheduling, process control, or other problems.

Figure 2B:
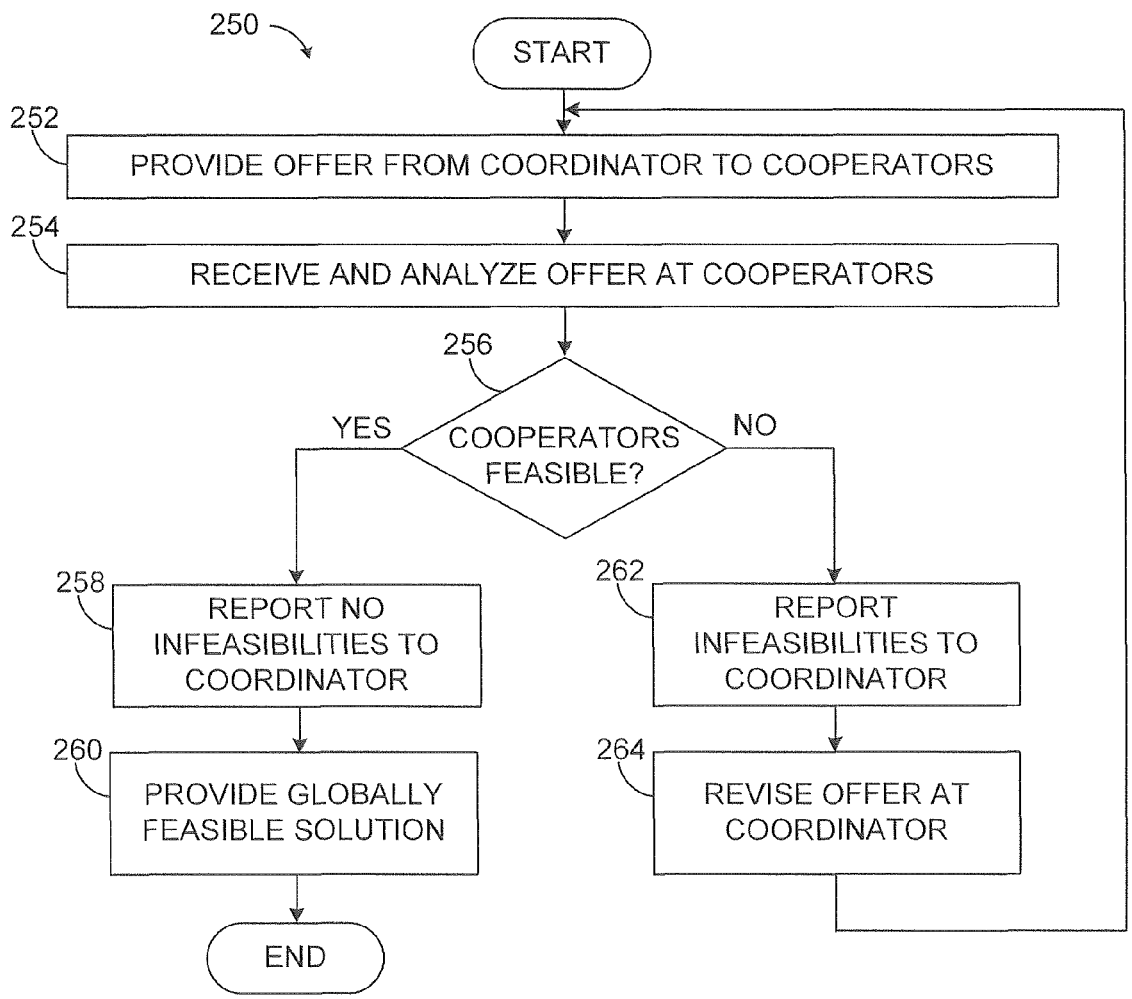

The coordinators 206 and cooperators 208 may generally operate as shown in FIG. 2B. A coordinator 206 may operate by providing information in the form of an offer to one or more of the cooperators 208 at step 252. An offer represents a possible solution to a problem being solved by the coordinator 206 (where the coordinator problem is a sub-problem to the general problem being solved using the decomposition 200). Each cooperator 208 receives and analyzes the offer at step 254, such as by determining if a problem being solved by the cooperator 208 can be solved with that offer (where the cooperator problems are other sub-problems to the general problem being solved). If all of the cooperators 208 can generate a feasible solution at step 256, no infeasibilities are reported to the coordinator 206 at step 258. At this point, the coordinator 206 can recognize that a globally feasible solution has been identified, and that solution can be provided at step 260. Otherwise, at least one of the cooperators 208 generates an infeasibility, meaning the offer provided by the coordinator 206 cannot be met or satisfied by that cooperator 208. The cooperator 208 reports the infeasibility to the coordinator 206 at step 262. This causes the coordinator 206 to revise or change the offer at step 264, and the process returns to step 252 where the coordinator 206 provides the revised offer. The revision to the offer could be designed to help reduce or eliminate any reported infeasibilities. In this way, the coordinator 206 and the cooperators 208 can function together to identify a solution that is acceptable to the coordinator 206 and all of the cooperators 208.

As can be seen in FIGS. 2A and 2B, two-way communication is provided between the coordination layer 202 and the cooperation/collaboration layer 204 in FIG. 2A. In practice, it is often the case that hierarchical systems do not contain any feedback from the lower layers to the upper layers. For example, when a master schedule has been calculated for an entire process plant, individual schedulers using their collaborating spreadsheet simulator tools have very limited means for relaying information back to the master scheduler when the scheduling targets for a time period cannot be achieved. Rather, inconsistencies in the individual schedules are later apparent as infeasibilities and inefficiencies, such as product reprocessing or an inability to meet customer order due-dates on time.

In accordance with this disclosure, two-way communication is provided between the layers 202-204. Feedforward information generally denotes information fed downward in FIG. 2A (from the coordination layer 202 to the cooperation/collaboration layer 204 for use by the cooperation/collaboration layer 204). Feedback information generally denotes information fed upward in FIG. 2A (from the cooperation/collaboration layer 204 to the coordination layer 202). The hierarchical decomposition 200 supports the integration and interfacing of these different decision-making layers to, among other things, achieve global feasibility in solutions to the complex problems.

The coordinators 206 and cooperators 208 may use models 210 and 212, respectively, during their operations. The models generally represent one or more systems associated with the problem being solved. For example, in a scheduling and planning problem or a process control problem, the models 210 could represent a larger number of process systems and/or larger portions of a process system, and the models 212 could represent individual process systems and/or smaller portions of a process system.

Any suitable type(s) of model(s) could be used here. In this document, "global" models may consider a broader or full scope of a decision-making system, such as in terms of the temporal and spatial dimensions of the system. An example is a fully integrated oil refinery that plans its production or manufacturing months into the future. On the other hand, "local" models may consider a narrower scope of the decision-making system, such as a sub-section of the decision-making system. An example is the gasoline blending area of the oil refinery or the first few time periods of a multiple time period planning model. In some embodiments, global models can be classified into the following classes (organized in decreasing order of detail):

Rigorous models contain most or all of the known production constraints, variables, and bounds that exist in the local rigorous models of a system.

Restricted models are partially rigorous, meaning they include most or all of the detailed constraints, variables, and bounds of sections of the entire system.

Relaxed models are not necessarily rigorous but contain the feasible region of most or all cooperators, with certain constraints or bounds that have either been relaxed or removed.

Reduced models are not rigorous and only contain a portion of the feasible region of the cooperators, but they may contain, in spirit, the entire scope of a global problem.

As a particular example, in a distributed system for solving scheduling problems, master scheduling models 210 used in the coordination layer 202 are often relaxed, reduced, or restricted global models in that they may not contain all or substantially all of the processing, operating, and maintaining details of the entire process system. In the same context, individual scheduling models 212 used in the coordination/collaboration layer 204 are often local rigorous models since they often contain most or all of the necessary production constraints to accurately represent a sub-system. Scheduling models are often not global rigorous models due to the computation times that this might entail (although global rigorous models could be used). The concepts of global versus local and reduced/relaxed/restricted versus rigorous models may be relative. For instance, a model that is locally rigorous from a scheduling perspective may be considered globally relaxed from a process control perspective.

The above descriptions, as well as additional descriptions below, have used the phrase "globally feasible" solutions. With reference to FIG. 2A, "globally feasible" refers to a decision from the coordination layer 202 that is feasible for all cooperators 208 in the cooperation/collaboration layer 204. Globally feasible solutions indicate that a consensus has been reached between the coordination and cooperation/collaboration layers 202-204, as well as amongst the cooperators in the layer 204. A globally feasible solution may or may not represent the optimal or best global solution.

One aspect of making good decisions at the coordination layer 202 may include properly estimating or approximating a system's capability. This could involve roughly determining how much of a given product or other material the system can produce and in what time periods. If the capability is underestimated, there can be opportunity loss since the system could be more productive than expected. On the other hand, if capability is over-estimated, the expectations can be too high, and infeasibilities may be encountered at the cooperation/collaboration layer 204. This type of information could be determined manually or automatically, such as by analyzing the system's output over an extended period of time to identify the system's capability.

Moreover, in decomposed systems, there may be a need to know the constraints that should be included in each of the layers 202-204. The constraints generally limit the types of solutions that can be found by the layers 202-204. Knowledge about these constraints may or may not be limited to knowing the upper and lower ranges of the constraints. In the following discussion, the following types of constraints could be used by the hierarchical decomposition 200:

Public constraints are fully known to most or all elements in the system (coordinators 206 and cooperators 208). If all constraints In a system are public, this could indicate that the coordinator 206 may be a global rigorous model, while the cooperators 208 are local rigorous models. In this scenario, only one iteration between the coordinator 206 and the cooperators 208 may be needed in the system in order to identify a globally feasible solution since the coordinator's decisions may not violate any of the cooperators' constraints.

Private constraints are known only to individual elements of the system (coordinator 206 and/or cooperators 208). Private constraints could be very common in decomposed systems where the coordinator 206 does not know about all of the detailed or pedantic requirements of each cooperator 208. Also, the coordinator 206 can have private constraints not known to the cooperators 208.

Protected constraints are known to the coordinator 206 and only to one or a few of the cooperators 208. This situation may occur when the coordinator 206 has different levels of knowledge about each cooperator 208 or sets of cooperators 208 in the system.

Plot/ploy constraints are used in situations where one or more cooperators 208 join forces (such as via collusion) to fool or misrepresent their results back to the coordinator 206 for self-interest reasons.

The specific types of constraints used in the layers 202-204 could vary depending on a wide variety of factors, such as the parties involved with the operation of the process control system 100. As a particular example, constraints associated with businesses that compete could be treated as protected constraints, allowing each business' constraints to be known by a coordinator but not by the other competing business.

It may be noted that a problem can be decomposed into the hierarchical decomposition 200 in various ways. Also, the particular decomposition strategy used to decompose a problem could alter the way that solutions for that problem are found. Various decomposition strategies are described below and can be set up in the hierarchical decomposition 200. Whatever the decomposition strategy used to decompose a problem, any combination of public, private, and protected constraints could be used in the decomposed problem.

It may also be noted that problem decomposition can come at a price. For example, even though a local rigorous model in a decomposed or divisionalized system could be smaller (and thus simpler) than a global rigorous model, iterations between the coordination and cooperation/collaboration layers 202-204 may be required in order to achieve a globally feasible solution, which may increase overall computation times. Also, unless a global optimization technique (such as Lagrangean decomposition or spatial branch-and-bound search) is applied, there may be no guarantees that a globally optimal solution to the problem can be found.

Nevertheless, some restrictions can be placed on the decision-making system implemented by the layers 202-204 to provide very compelling reasons for the application of decomposition strategies. These restrictions can include the following, which can be enforced by the hierarchical decomposition 200:

Secrecy/security: In any given decision-making system, there may be private constraints, such as information that cannot be shared across the cooperators 208. This may be the case when different companies are involved in a process, such as in a supply chain with outsourcing. Also, the cooperators 208 may make their decisions using different operating systems or software, so integration of their models is not necessarily straightforward. It could also be difficult or impossible to centralize a system when the cooperators 208 use undocumented personal knowledge to make their decisions (which is often the case when process simulators or spreadsheets are used to generate schedules), unless significant investment is made in creating a detailed mathematical model.

Support: The ability to support and maintain a centralized or monolithic decision-making system may be too large and/or unwieldy.

Storage: Some decision-making models contain so many variables and constraints that it could be difficult or impossible to store these models in computer memory.

Speed: There may be very large and complex decision-making models that cannot be solved in reasonable time even though they can be stored in memory. In this situation, decomposition may be an option to reduce the computational time for obtaining good feasible solutions. In light of these requirements, decomposition may make sense and could be required (such as in cases where solutions are unavailable with decomposition).

The performance of any decomposition technique could be dependent on the nature of the decision-making system in question and on how the decomposition is configured. Defining the decomposition strategy can be a challenge in itself and can be highly subjective. One decision to be made when decomposing a system (often one of the first decisions) is the dimension of the decomposition. Various options are often available, such as decomposing the system in the time domain, the spatial equipment domain, the spatial material domain, or some combination of these three dimensions. If decomposing in the time domain, a decision can be made regarding the number of sub-problems (such as two sub-problems with half of the schedule's time horizon in each half, or five sub-problems with one fifth of the schedule's time horizon in each fifth). A decision also often needs to be made whether there is any time overlap between the sub-problems. These decisions are often problem-specific, and the application of decomposition strategies therefore often requires a deep understanding of the underlying decision-making system. The HDH application 154 could support various types of strategies, including centralized, coordinated, collaborative, and competitive reasoning approaches. These approaches allow the HDH application 154 to be used in a wide variety of problem-solving systems.

The most effective decision-making tool for any given system may be a fully centralized strategy that uses a global rigorous model (provided it satisfies the secrecy, support, storage, and speed restrictions mentioned above). If that is not possible, decomposition may be necessary or desirable. If decomposition is used, one decomposition strategy (possibly the best) could be a coordinated one in which the cooperators 208 can work in parallel. If a coordinator 206 does not exist, another approach (possibly the next best) may be a collaborative strategy in which the cooperators 208 work together, obeying a certain priority or sequence in order to achieve conformity, consistency, or consensus. Yet another approach (possibly the worst-case decision-making scenario) is a competitive strategy in which the cooperators 208 compete or fight against each other in order to obtain better individual performance. This type of scenario can be somewhat approximated by a collaborative framework in which the cooperators 208 work in parallel or simultaneously, as opposed to operating in series or in priority.

Among other things, the hierarchical decomposition 200 provides a technique for integrating, interfacing, and interacting with diverse decision-making layers or levels by using feedforward and feedback information. This technique enables various types of integration. For example, horizontal integration can be used across decision-making layers or levels (such as in coordinated systems). Also, vertical integration can be used within a decision-making layer or level (such as in collaborative systems). Further, multi-layer or multi-level integration is enabled, such as when a collaborator in one HDH protocol acts as a coordinator for a lower-layer protocol. In addition, this technique provides a completely flexible model structure in the hierarchical layers 202-204. Each element may be represented by a rigorous, relaxed, reduced, or restricted type of model. Moreover, any type of constraint may be included in the models and handled directly, such as public, private, or protected constraints or any combination thereof.

Figure 3:
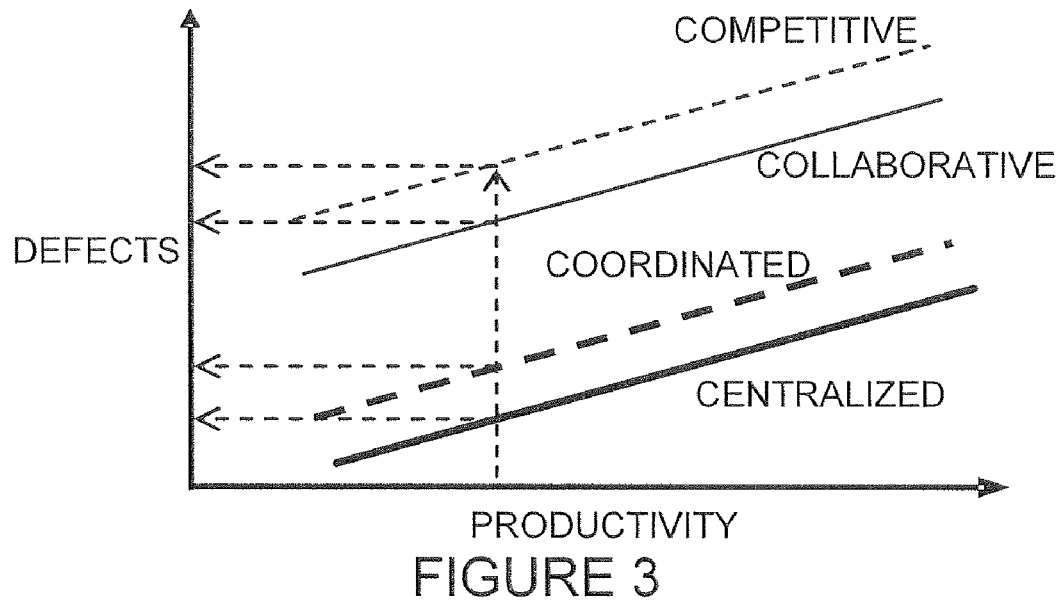

FIG. 3 illustrates hypothetical value statements for these four types of strategies. In particular, FIG. 3 illustrates "defects versus productivity" trade-off lines or curves for the four types of strategies. Using these lines or curves, for the same productivity represented by the vertical dotted line, there are varying levels of defects (depending on whether the centralized, coordinated, collaborative, or competitive strategy is used). These lines or curves represent an operating, production, or manufacturing relationship for a particular unit, plant, or enterprise. Each line can also represent a different reasoning isotherm in the sense of how defects versus productivity changes with varying degrees of reasoning. The centralized reasoning isotherm has the lowest amount of defects for the same productivity, while the competitive reasoning isotherm has the highest amount of defects for the same productivity (as expected).

Collaborative reasoning could imply that there is no coordination of the cooperators 208 in a system. As each cooperator 208 finds a solution to its own decision-making problem, it may strive to reach a consensus with the adjacent cooperators 208 based on its current solution. The solution to a global decision-making problem may then depend on most or all of the cooperators 208 across the system reaching an agreement or equilibrium in a prioritized fashion, where each cooperator 208 only has limited knowledge of the cooperator(s) 208 directly adjacent to itself. Collaborative reasoning may therefore reach a "myopic" conformance between connected cooperators 208. In cases where no priorities are established for the cooperators 208, the collaborative strategy can easily become a competitive one since the cooperator 208 that is the fastest at generating a feasible schedule for itself gains immediate priority over the other cooperators 208. The cooperators 208 therefore compete in terms of speed to simplify their decisions, given that the cooperator 208 that has top priority is the one that is the least constrained by the remainder of the decision-making system.

Coordinated reasoning, on the other hand, contains the coordination layer 202 with a model 210 of the global decision-making system (although the model 210 could be a simplified one, such as a relaxed, reduced, or restricted model). As a result, conformance between the cooperators 208 can be reached based on a global view of the system. This may entail a reduced number of iterations between the hierarchical layers 202-204 for some problems when compared to collaborative strategies, such as when the flow paths of the interconnected resources of the cooperators 208 are in a convergent, divergent, or cyclic configuration as opposed to a simple linear chain (such as in a flow-shop or multi-product network).

Centralized systems can be viewed as a subset of coordinated systems since any coordinated strategy can be equivalent to a centralized one when the coordination layer 202 contains a global rigorous model 210. Also, coordinated strategies can be a superset of purely collaborative systems since the latter includes a set of interconnected cooperators 208 with no coordination. Collaboration can be enforced in a coordinated structure in any suitable manner, such as by assigning the same model 212 used by one of the cooperators 208 as the model 210 used by the coordinator 206. Centralized systems often do not suffer from the fact that there are arbitrary decomposition boundaries or interfaces. This implies that in a monolithic or centralized decision-making problem, it may be the optimization solver or search engine that manages all aspects of the cooperator sub-system interactions. Examples of these interactions can include the time delays between the supply and demand of a resource for two cooperators 208 or the linear and potentially non-linear relationships between two or more different resources involving multiple cooperators 208. In the centrally managed problem, these details can be known explicitly. In the coordinated or collaborative managed problems, these might be only implicitly known and can be handled through private/protected information.

Figure 4:
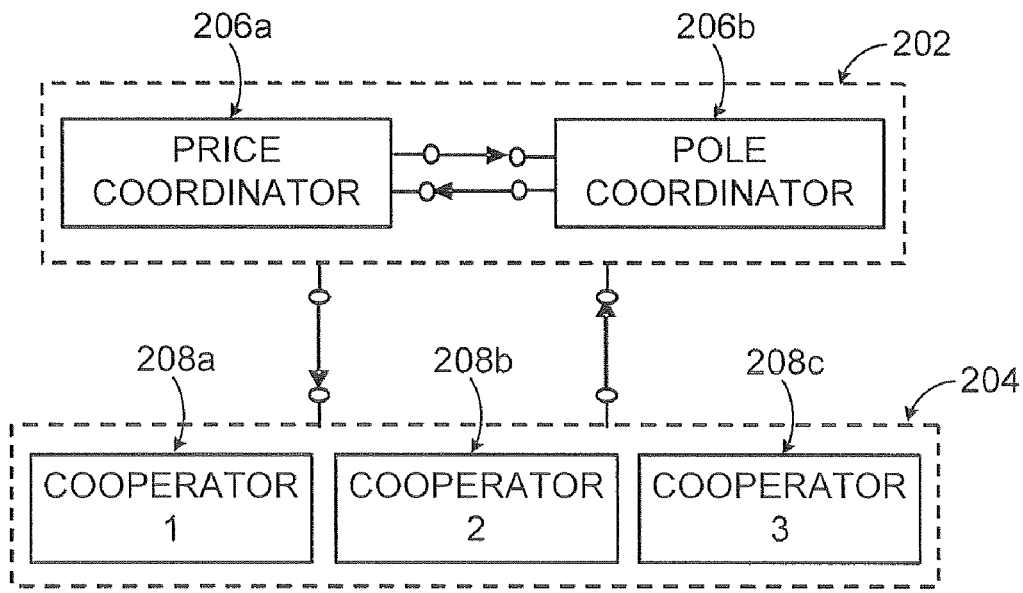

FIG. 4 illustrates additional details regarding a specific implementation of the hierarchical decomposition 200. In the example shown in FIG. 4, two different coordinators reside within the coordination layer 202, namely a price coordinator 206a and a pole coordinator 206b. Also, FIG. 4 illustrates three distinct cooperators 208a-208c in the coordination/collaboration layer 204. The price coordinator 206a generally makes price offers that can be used by the cooperators 208a-208c to solve a problem, while the pole coordinator 206b generally makes pole offers that can be used by the cooperators 208a-208c to solve the problem. Also, within the coordination layer 202, there may be price and/or pole coordination between the coordinators 206a-206b. Further, the coordination layer 202 (either the coordinators 206a-206b themselves or an additional coordinator, super-project, or other element) provides the poles and/or the prices to the appropriate cooperators. Once that information is evaluated by the cooperators, feedback information can be sent to the coordinators 206a-206b. It may be noted that the cooperators 208a-208c do not communicate with each other in FIG. 4, meaning there is no collusion or consorting between them. This closed-loop procedure can continue until an equilibrium or a stable balance point is reached between the two decision-making layers 202-204.

The term "pole" here refers to information that is exchanged in a decomposed problem regarding the quantity, quality, and/or logic of an element or detail of the system. Quantity variables are typically associated with quantities of products or other materials and can take the form of lot, charge, batch, and movement sizing in the problem being solved. These variables could be used mainly in quantity or material balances, as well as semi-continuous logistics constraints. There can be matching logic variables for each quantity sizing variable. These logic variables can be associated with unit-operation pairs (definitions of operations to be performed on units of material) and unit-operation-port connections and routes (definitions of routes between units handling the material). Logic variables can include semi-continuous flows, single-use restrictions (such as with unary resources), up-times (such as for campaigns and cycles), down-times, and switch-over-when empty or full. These logic variables are often non-linear or non-convex and can be "complicating" variables that require the use of mixed-integer linear programming (MILP) with a branch-and-bound searches or other techniques. The quality variables can be classified into various classes, such as compositions, properties, and conditions. Compositions can represent the volume or weight fractions of a particular component in a stock or stream (such as for a material within a composition). Properties can represent a volume or weight-based empirical chemical property, such as an octane, specific gravity, or melting index. Conditions can represent physical properties such as temperature and pressure, as well as other processing or operating conditions such as severity and conversion.

Figure 5:
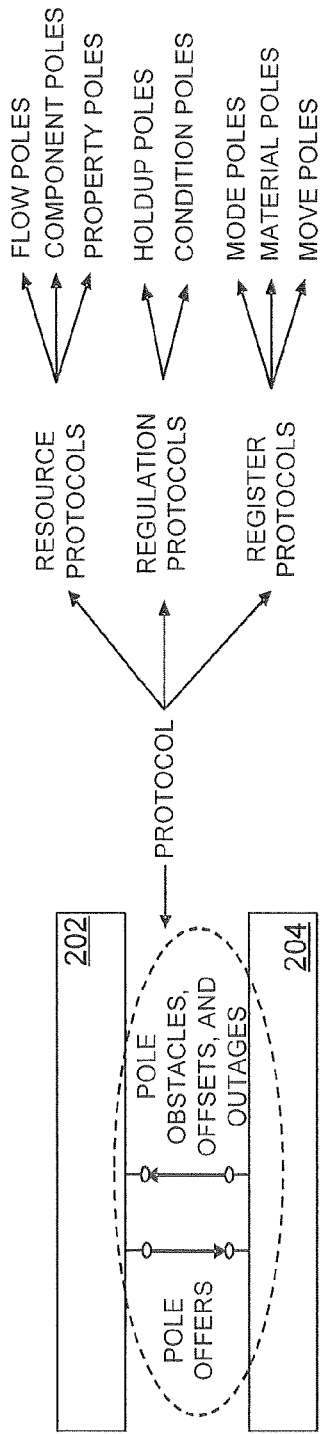

The exchange of pole information between the decision-making layers 202-204 may be denoted as "protocols," examples of which are shown in FIG. 5. These protocols enable communication between the layers 202-204 and can manage the cyclic, closed-loop nature of decomposition information exchange. In the example in FIG. 5, the poles sent between layers 202-204 can be classified into three distinct elements as follows:

Resource protocols relate to extensive and intensive variables that may be exchanged between sub-problems or cooperators 208, such as flow poles (like a number of barrels of oil per day in a stream), component poles (like a light straight-run naphtha fraction in a stream), and property poles (like density or sulfur of a stream).

Regulation protocols refer to extensive and intensive variables that may not usually be transported or moved across cooperators 208 and may reflect more a state or condition, such as holdup poles (like a number of barrels of oil in a particular storage tank) and condition poles (like degrees Celsius in a fluid catalytic cracking unit).

Register protocols refer to extensive and intensive logic variables in a system and may involve mode poles (like the mode of operation of a process unit), material poles (like material-service of a process unit), and move poles (like streams that are available for flowing material from one process unit to the next). These register protocols may represent intensive logic variables. An example of an extensive logic variable may be the duration or amount of time a mode of operation is active for a particular unit.

During problem-solving, various ones of these protocols can include a "pole offer" sent to the cooperators 208a-208c that originates from the pole coordinator 206b. Each of the cooperators 208a-208c analyzes the pole offers and determines whether it can provide a solution that satisfies the pole offers. If not, the cooperators 208a-208c can return infeasibilities to the coordinator, where the infeasibilities identify any inability of a cooperator 208 to meet the requirements specified by the coordinator 206. The infeasibilities therefore indicate whether a pole offer has been accepted by the cooperators 208a-208c. The infeasibilities could include the following types:

Pole obstacles refer to infeasibilities that relate to the resource protocols.

Pole outages refer to infeasibilities that relate to the regulation protocols.

Pole offsets refer to infeasibilities that relate to the register protocols.

If the cooperators 208a-208c all accept a feasible, consistent pole offer, the pole obstacles, offsets, and outages can be set to zero for the cooperators 208a-208c. This informs the coordinator 206 that a globally feasible solution to the problem has been found.

The protocols identified in FIG. 5 may be similarly applied to prices (monetary values) and can be used with price offers provided by the price coordinator 206a. Prices are often related to adjustments in the quantity, quality, or logic elements of the system. For example, the prices could typically correspond to the dual values of the poles, and the adjustment of prices can be used to establish a quantity balance between supply and demand (also known as the "equilibrium price" in economic theory). This adjustment can be based on the economic principle that a resource's price can be increased to increase the supply of the resource and the resource's price can be reduced to increase the demand for the resource. It may be noted that open markets traditionally use price protocols, while closed markets traditionally use pole protocols.

If each cooperator 208a-208c has no common, connected, centralized, shared, linked, or global elements, the cooperators would be completely separate and could be solved independently. When there are common elements between two or more cooperators that either directly or indirectly interact, completely separated solution approaches may only yield globally feasible solutions by chance. A centralized decision-making strategy can have accurate and intimate knowledge of resource, regulation, and register poles and how each is related to the other across multiple cooperators, even how a resource pole links to or affects (in some deterministic and stochastic way) a register pole. Abstracting a centralized system into a coordinated and cooperative system can involve abstracting or abbreviating details of synergistic (positively correlated) and antagonistic (negatively correlated) interactions. As such, it is possible to lose information associated with cooperator feedback in terms of time, linear space, and non-linear space. For example, the dead-time, delay, or lag of how a change in a pole affects itself over time may need to be properly understood (since it is known from process control theory that dead-time estimation can be an important component in robust and proformant controller design). Linear spatial interactions represent how one pole's rate of change affects another pole's rate of change, which is also known as the "steady-state gain matrix" defined at very low frequencies. Well-known interaction analysis techniques, such as the relative gain array (RGA), can be used to better interpret the effect and pairing of one controlled variable with another. In addition, multivariate statistical techniques, such as principle component analysis (PCA), can be used to regress temporal and spatial dominant correlations given a set of actual plant data and to cluster poles that seem to have some level of interdependency. Non-linear spatial interactions define how non-linear effects exist at different operating, production, or manufacturing points, which can completely alter the linear relationship from a different operating point. In particular embodiments, some level of non-linear relationship can be included in a coordinator's restricted, relaxed, or reduced model 210 as a best practice for strongly non-linear pole interactions.

Figure 6:
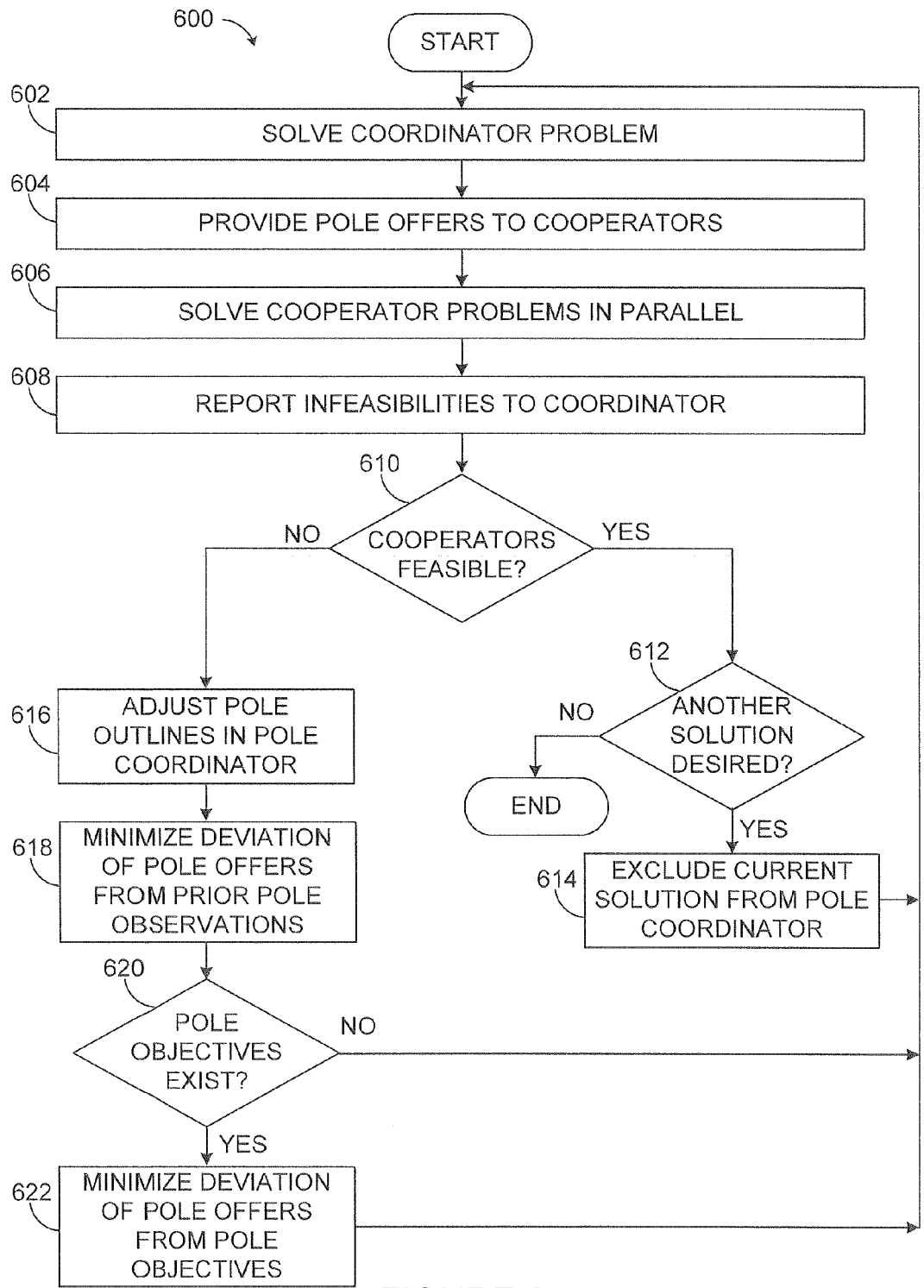

FIG. 6 illustrates an example method 600 implementing the hierarchical decomposition heuristic to achieve a coordinated or hierarchical equilibrium between decision-making layers. For example, the method 600 could be used by the HDH application 154 in various components in FIG. 1, which can implement the coordinators 206 and cooperators 208 needed to solve a particular problem. Here, the coordinator 206 is responsible for enabling conflict resolution, consensus reconciliation, continuous refinement, and challenge research (all of which are explained in more detail).

The individual steps in FIG. 6 implement a coordinated reasoning procedure. It is assumed here that a scheduling problem is being decomposed and solved with mixed-integer linear programming. However, the method 600 could be used to solve any other suitable problem using any suitable programming or other technique.

In FIG. 6, a coordinator problem is solved at step 602. This could include, for example, using a relaxed/reduced/restricted model 210 in the coordination layer 202 to identify a provably-optimal solution (if possible) or until a specified amount of computational time has elapsed. One assumption can be made here that there are common, shared, or linking poles between the coordination layer 202 and the cooperation/collaboration layer 204, which are managed through the protocols described above. Initial lower and upper bounds on the quantity, quality, or logic variables for the pole offers (such as for the resource, regulation, and register protocols) can be exogenously supplied by a modeler or a user when initializing the method 600. Note that there may be as many poles as the number of time-periods in the decision-making or scheduling horizon for each resource, regulation, and register protocol. This can be expressed as:

$$P_{i,k-1}^{LB} \leq P_{i,k} \leq P_{i,k-1}^{UB}, \forall i=1\ldots NP. \quad (1)$$

The bounds or "pole outlines" of the poles in Equation (1) can be specified for the number of poles or equivalently for the number of protocols. The k subscript refers to the current iteration of the method 600, where k−1 refers to the previous iteration. The lower and upper pole outlines can be managed by the coordinator 206 and can be changed at each iteration if there are non-zero pole-obstacles, offsets, and/or outages provided by any cooperators 208.

From the solution of the coordinator problem, quantity, quality, and/or logic pole offers $P_{i,k}$ are obtained and sent to appropriate cooperators at step 604. In this step, variables in the coordinator and cooperator problems that are not involved in the protocols may be known only to themselves and may not be externalized (they are essentially private variables).

Cooperator problems are solved in parallel using the pole offers at step 606. This may include, for example, solving all local rigorous models 212 in the cooperators 208 using the pole offers from the coordinator 206. In each cooperator 208, two values can be attached to or otherwise associated with each pole offer. These values may be referred to as a pole obstacle, offset, or outage "shortage" and a pole obstacle, offset, or outage "surplus" (which are denoted $\Delta P_{i,sp,k}^{+}$ and $\Delta P_{i,sp,k}^{-}$, respectively). In the following, the expression "i∈sp" indicates that pole i belongs to a particular cooperator sp, where (for resource protocols) the pole offer is sent to two cooperators (an upstream or "supplier" cooperator and a downstream or "demander" cooperator). The shortage and surplus variables may have the following constraints:

$$P_{i,sp,k} + \Delta P_{i,sp,k}^{+} - \Delta P_{i,sp,k}^{-} = P_{i,k}, \forall i=1\ldots NP, sp=1\ldots NSP, i \in sp. \quad (2)$$

The shortage and surplus variables can be added to an objective function used in the individual cooperators 208. An objective function defines the overall goal or objective of a cooperator 208. The shortage and surplus variables can then be minimized using a suitably large weight (such as an order of magnitude larger than any other term in the objective function). Note that the shortage and surplus variables could be mutually exclusive or complements to one another. In a coordinated strategy, the cooperators 208 can be solved in parallel, which can significantly decrease the overall computational effort of the method 600 if several central processing units (CPUs) are available. Additionally, the cooperators 208 could be solved until a provably-optimal solution is obtained, or they may be stopped after a certain amount of computation time has elapsed.

Any infeasibilities identified by the cooperators are reported to the coordinator at step 608. This may include, for example, the cooperators 208 reporting any pole obstacles, offsets, and outages to the coordinator 206. The pole obstacles, offsets, and outages may generally identify any problems that the cooperators 208 have in meeting the requirements specified by the coordinator 206. This may also include the cooperators 208 reporting that no pole obstacles, offsets, and outages have been found, meaning the cooperators 208 have identified a feasible solution to be problem be solved.

A determination is made whether the cooperators have identified a feasible solution at step 610. This may include, for example, the coordinator 206 determining whether any non-zero pole obstacles, offsets, and outages have been reported. If a feasible solution has been found, a determination is made whether additional solutions are desired at step 612. This could include, for example, the coordinator 206 determining whether the identified solution meets any specified conditions. It could also include the coordinator 206 determining that additional time is available for identifying solutions.

If no additional solutions are needed or desired, the method 600 ends. At this point, a globally feasible solution has been identified by the coordinator 206 and the cooperators 208. If an additional solution is needed or desired, the current solution is excluded from the possible solutions that could be found by the coordinator at step 614, and the method 600 returns to step 602 to identify a different solution to the coordinator problem. During the next iteration, the coordinator 206 can identify one or more different pole offers, which can be used to find a different solution to the problem being solved. The same pole outlines $P_{i,k}^{LB}$ and $P_{i,k}^{UB}$ could be used in the next iteration, or the pole outlines could be re-initialized to their original starting values or to some other values. The subsequent iterations may be viewed as an improvement stage of the method 600 in that the method 600 is attempting to identify better solutions (although this could be omitted in the method 600). This improvement stage may be referred to as "continuous refinement."

If the cooperators have not identified a feasible solution, one or more of the pole outlines in the pole offers are adjusted by the pole coordinator at step 616. This could include, for example, the pole coordinator re-calculating new pole outlines or adjusting the current pole outlines. In cases where the pole offer $P_{i,k}$ from the coordinator 206 is sent to more than one cooperator 208 (such as might be done for a resource protocol), the largest pole obstacle (in absolute terms) across the cooperators 208 affected by the specific resource i could be used to adjust the pole outlines. In particular embodiments, the pole outlines could be adjusted using the following:

$$P_{i,k}^{LB} = P_{i,k-1}^{LB} - SSL \cdot \max_{sp}(\Delta P_{i,sp,k-1}^{+}) + SSL \cdot \max_{sp}(\Delta P_{i,sp,k-1}^{-}) \quad (3)$$

$$P_{i,k}^{UB} = P_{i,k-1}^{UB} - SSU \cdot \max_{sp}(\Delta P_{i,sp,k-1}^{+}) + SSU \cdot \max_{sp}(\Delta P_{i,sp,k-1}^{-}), \quad (4)$$

$$\forall\, i = 1 \ldots NP,\, i \in sp.$$

Here, there are two lower and upper step-size adjustment parameters (denoted SSL and SSU, respectively). These parameters provide added flexibility for defining different rates of change for the lower and upper bounds in the coordinator problem. In some embodiments, these parameters may default to a value of one. In the following discussions, the operator $$\max_{sp}(.)$$

implies the maximum over all cooperators sp. In other embodiments, for some decomposed problems, the aggregating operator $$\mathrm{sum}_{sp}(.)$$

may be used. This allows the cooperators 208 to feed back to the coordinator 206 what the cooperators 208 are capable of doing in terms of their achievable capacity or capability. This stage may be referred to as "conflict resolution."

In real-life decision-making problems, short-term decisions could be more important than long-term decisions due to the uncertainty in decision-making systems. For example, a long decision-making horizon could increase the chances of unforeseen events occurring that could possibly change future decisions. Therefore, if deemed necessary or desired, the pole obstacles, offsets, and outages can be temporally and spatially prioritized (weighted) in the cooperators' objective functions in order to account for this uncertainty during step 616. Also, the stopping criterion of the method 600 (step 610) may incorporate an equivalent prioritization strategy.

Figure 7A:
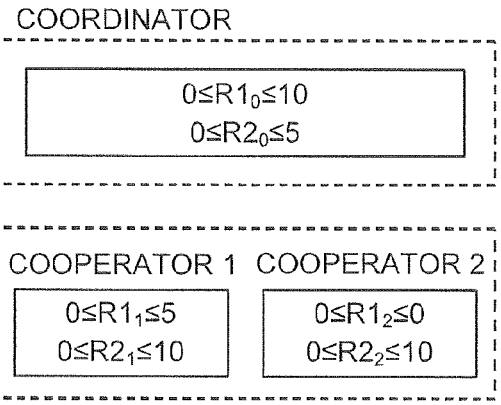
Figure 7B:
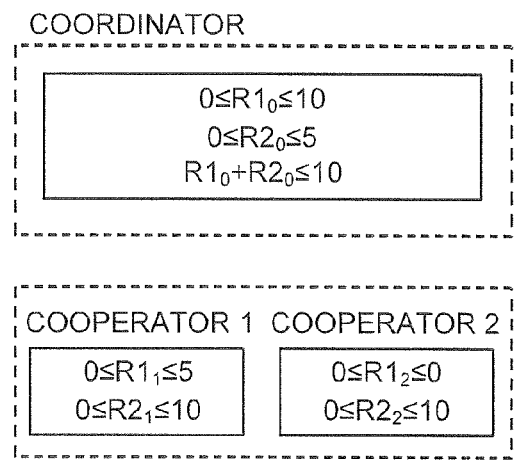
Figure 7C:
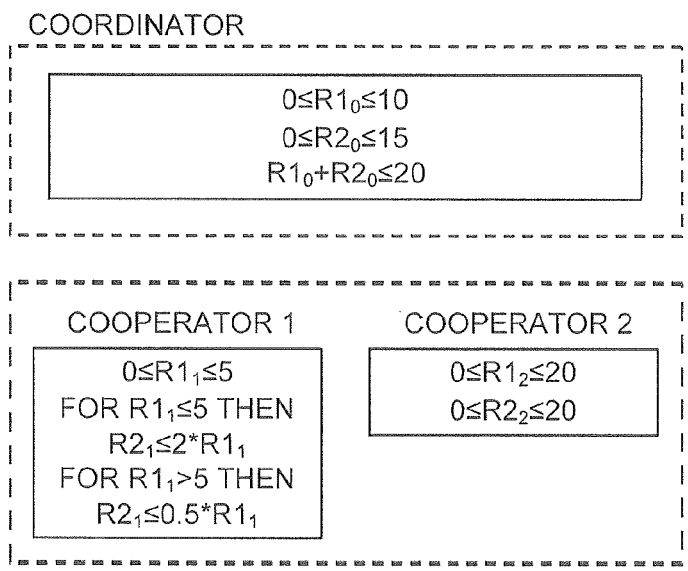

Three examples shown in FIGS. 7A through 7C illustrate the operations that could occur during step 616. In FIG. 7A, the original bounds for two resources (denoted R1 and R2) in both a coordinator and two cooperators are shown. Here, R1 and R2 may correspond to two different resources exchanged by the cooperators or to a single resource over two time-periods. The subscripts used with R1 and R2 (0, 1, and 2) refer to the resources in the coordinator, the first cooperator, and the second cooperator, respectively. The objective of the coordinator is to maximize the usage of R1 and R2 in the system. In addition, note that there is a discrepancy in the capacity for the second cooperator with respect to $R1_2$. Due to a hypothetical breakdown in the second cooperator, $R1_2$ cannot be processed and has an upper bound of zero. However, this may not be known to the first cooperator and might only be known to the coordinator (after the second cooperator informs the coordinator via feedback). This allows the coordinator to make updates to the pole outlines.

The particular problem shown in FIG. 7A could be solved in two iterations. Since the objective of the coordinator is to maximize the usage of R1 and R2, the pole offers in the first iteration could be ten for R1 and five for R2 (the maximum for both resources). Because the pole offer for R1 exceeds the upper bounds of this resource by five units in the first cooperator and by ten units in the second cooperator, two pole obstacles are generated for the R1 pole offer. The R2 pole offer is feasible for both cooperators, so no pole obstacles are generated for this pole offer. During step 616, the bounds of $R1_0$ in the coordinator can be adjusted downward by ten units (to $-10 \leq R1_0 \leq 0$), where ten units is the maximum value in the two pole obstacles. The bounds of $R2_0$ in the coordinator remain unchanged. By maximizing R1 and R2 with the new bounds, the new pole offers for R1 and R2 are zero and five, respectively. This is a globally feasible solution since no pole obstacles would be generated for the pole offers.

In FIG. 7B, the original bounds for R1 and R2 in both the coordinator and the cooperators are again shown. The only difference between this example and the example shown in FIG. 7A is the coordinator's model. In FIG. 7B, the coordinator needs to satisfy an additional inequality constraint involving $R1_0$ and $R2_0$ (namely that $R1_0+R2_0 \leq 10$), which in this case makes the coordinator problem degenerate. This problem could take three iterations to solve. Initially, the pole offers for R1 and R2 may both be five. These pole offers satisfy all cooperator constraints except for the $R1_2$ bound in the second cooperator, which is exceeded by five units. The second cooperator therefore reports an infeasibility of five units to the coordinator. In the second iteration, the bounds on $R1_0$ in the coordinator are shifted down by five units (to $-5 \leq R1_0 \leq 5$), and again five and five are the new pole offers. The same pole obstacle exists for $R1_2$ in the second cooperator. In the third iteration, the bounds on $R1_0$ are once more shifted down by five units ($-10 \leq R1_0 \leq 0$), and the new pole offers are zero and ten, which is a globally feasible solution. Note that, because of the introduction of degeneracy in this problem, the number of iterations needed to arrive at a globally feasible solution has increased.

In FIG. 7C, the original bounds for R1 and R2 in both the coordinator and the cooperators are shown. In this example, a disjunction or discontinuity is introduced in the first cooperator. In this case, the upper bound of $R2_1$ can be one of two functions of $R1_1$, depending on the value of $R1_1$. Again, three iterations may be required to solve this problem. In the first iteration, the pole-offers may be five for R1 and fifteen for R2, which results in an infeasibility of five units from the first cooperator. The range for R2 is therefore dropped down by five units ($-5 \leq R2_0 \leq 10$) during the second iteration, which again results in an infeasibility of five units from the first cooperator. The range for R2 is therefore dropped down by another five units ($-10 \leq R2_0 \leq 5$) during the third iteration, which results in a globally feasible solution. Here, three iterations are needed even in the presence of a degenerate problem with disjunctions. This could be of importance in mixed-integer linear programming problems, where the integer variables express disjunctions in the model and there is a significant amount of degeneracy (especially in the time domain).

Returning to FIG. 6, the deviation between the pole offers and prior pole observations is minimized at step 618. A "pole observation" refers to the level of the pole offer that each cooperator can admit or achieve and can represent deviations (positive or negative) from the pole offers as determined by the cooperator optimizations. This stage may be referred to as "consensus reconciliation."

Here, step 618 is used to accelerate the convergence of the method 600 to a globally feasible or consistent solution. It may involve adding an extra term to the objective function of the coordinator, where the extra term is used to minimize the deviation of the current iteration's pole offers from the consensus between the cooperators' pole observations in the previous iteration. The consensus between the cooperators can be reached by averaging adjacent cooperator pole observations (sp and sp') that refer to the same resource i in the coordinator (the same pole opinion). This is represented by the second, averaged term in the left-hand side of Equation (5) below. For regulation and register protocols, there may be only one cooperator involved, which is different from a resource protocol that has both upstream and downstream cooperators. The adjustment made to a pole offer could be expressed as follows:

$$P_{i,k} - \frac{P_{i,sp,k-1} + P_{i,sp',k-1}}{2} = \Delta P_{i,k}^+ - \Delta P_{i,k}^-, \quad (5)$$

$$\forall i = 1 \ldots NP, i \in sp, sp'.$$

Pole outliers (denoted $\Delta P_{i,k}^+$ and $\Delta P_{i,k}^-$) can be added to the objective function of the coordinator using a pole outlier weight $w_i$, which can be calculated as the maximum value of the pole outlier shortage and surplus from the previous iteration. This could be expressed as follows:

$$w_i = \max(\Delta P_{i,k-1}^+, \Delta P_{i,k-1}^-), \forall i=1 \ldots NP. \quad (6)$$

During the first iteration of the method 600, the weights $w_i$ could be set to zero, which basically removes the pole outlier minimization for that iteration. The reason for weighting the pole outliers by the previous iteration's maximum value is to give more relative weight to those pole outliers that are deviating more from the consensus or average. If there is consensus in the previous iteration for a particular resource, the weight can be zero for the following iteration. The new objective function term to be minimized for consensus reconciliation during step 618 in the coordinator can therefore be expressed as:

$$\sum_{i=1}^{NP} w_i \cdot (\Delta P_{i,k}^+ + \Delta P_{i,k}^-). \quad (7)$$

The rationale for achieving a consensus for each resource, regulation, and register protocol is related to the notion of harmonizing pole opinions between one or more cooperators. Since the method 600 is seeking a globally feasible solution, finding solutions that are consistent amongst each cooperator and the coordinator is aided by minimizing pole outliers between the interested parties. Steps 616-618 could implement a technique for solving combinatorial problems using a greedy constructive search, which attempts to find feasible solutions at the start of the search.

A determination can also be made whether any pole objectives are available at step 620. If not, the method returns to step 602 to solve the coordinator problem again using the adjusted pole outlines in the pole offers. If any pole objectives are available, the deviation between the pole offers and pole objectives is minimized at step 622. The process then returns to step 602. A "pole objective" generally represents a target value for a pole offer, which could be specified by a higher-level system that is above the coordination layer 202. For instance, if the coordinator is a master scheduler and the cooperators are individual schedulers, a planner could provide the pole objectives (targets). This step may be referred to as "challenge research."

The use of pole objectives could provide one or more benefits. For example, pole objectives can decrease the number of iterations of the method 600 since, if a plan is achievable, the pole objectives can help maneuver the coordinator to find globally feasible solutions faster. Also, pole objectives can facilitate finding better globally feasible solutions given that a planner's goal is often to push a system to regions of higher efficiency, effectiveness, and economy. During step 622, variables representing the deviation of the pole offers from the pole objectives can be called pole opportunities and can be expressed as:

$$P_{i,k} - PP_i = \Delta PP_{i,k}^+ - \Delta PP_{i,k}^-, \forall i=1 \ldots NP. \quad (8)$$

Also, an additional objective function term in the coordinator associated with the pole opportunities can be expressed as:

$$\sum_{i=1}^{NP} ww_i \cdot (\Delta PP_{i,k}^+ + \Delta PP_{i,k}^-). \qquad (9)$$

The pole opportunity weights are denoted $ww_i$ and can be determined according to the same strategy as the pole outlier weights $w_i$.

Figure 8:
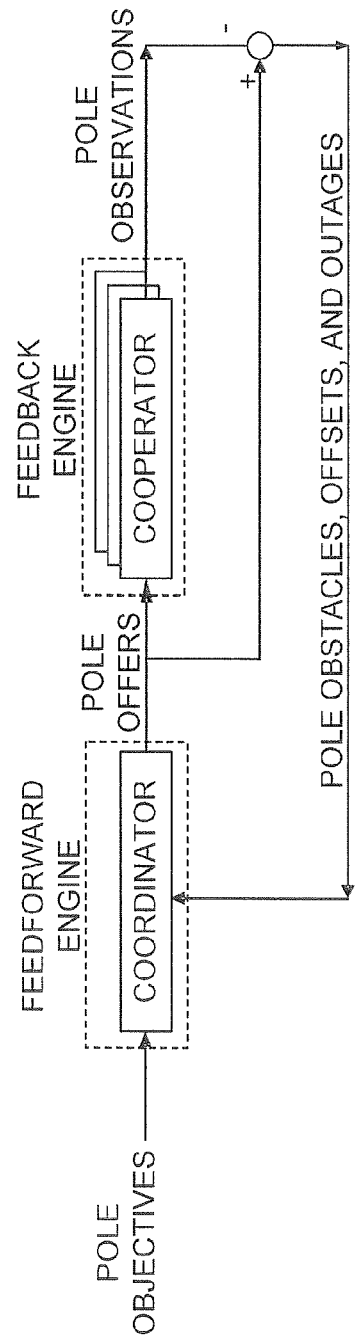

As noted above, the hierarchical decomposition 200 and the method 600 could be used to solve various types of problems. The examples given above often focus on planning and scheduling problems. FIG. 8 illustrates an example technique for using the hierarchical decomposition 200 and the method 600 to implement the functionality of model predictive controllers (MPC). This type of controller often has three forms (linear, non-linear, and hybrid). FIG. 8 illustrates the coordinator operating as the MPC's feedforward engine (or economic/efficiency optimizer), and the cooperators correspond to the MPC's feedback engine (or actual plant). The coordinator sends setpoints (pole offers) to the cooperators. The measured variables of the system are the pole observations, while the predicted variables are the setpoints. The difference between the predicted and measured variables corresponds to what is known as the MPC's bias terms (pole obstacles, offsets, and outages), which are fed back to the coordinator for re-optimization. If pole objectives exist, they can be used within the coordinator's optimization problem.

When limited feedback information (such as the bias updating strategy in an MPC or a linear real-time optimizer) is used to update model parameters, there is a possibility that the closed-loop system may not converge to an optimal operating policy in the plant, even for linear systems with no structural mismatch. Due to the relationship between the HDH application 154 and MPC and because there may be significant parametric and structural mismatch between the coordinator and cooperators, the system may converge to sub-optimal solutions. This mismatch could originate due to the existence of private constraints. Techniques could be used with the method 600 to gauge the difference in terms of the objective function value (profit, cost, etc.) between using globally rigorous and relaxed or reduced coordinators. Also, model improvement efforts could be focused on the most significant section(s) of the model in terms of objective function value.

Figure 9:
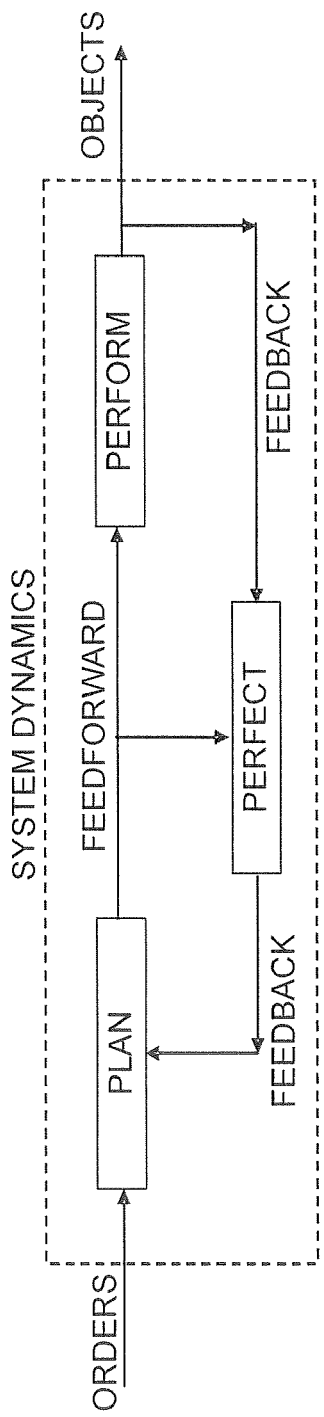

Another example use of the hierarchical decomposition 200 and the method 600 is shown in FIG. 9, which illustrates the continuous-improvement "plan-perform-perfect" loop or "P3-loop." FIG. 9 illustrates both feedforward and feedback components. In the context of the hierarchical decomposition 200, the plan and perfect functions could be included in the coordinator, while the perform function embodies the cooperators. There is a feedforward loop from the plan function to both the perform and perfect functions. There is also a feedback loop from the perform function through the perfect function back to the plan function. It may be noted that the perfect function's feedback to the plan function can take several forms, which could include updating, re-calibrating, or re-training the decision-making model in terms of both structure and parameters inside the plan function. This could be viewed as occurring inside the perfect function.

The dashed box in FIG. 9 may represent an input-output relation for any manufacturing or production plant, site, enterprise, or system in terms of how orders are input and how objects (such as material, information, or work product) are output from the system. The P3-loop is also a useful tool in analyzing and interpreting system dynamics in terms of the many contributors to the variability of lead-time, cycle-time, dead-time, or delay when an order is placed by an external or internal customer and when the objects are finally received by the customer some time into the future. In other words, the dashed box may represent the overall system in a black-box or block form. In addition, the P3-loop (which could essentially be an organizational or managerial archetype) could exist at some level or degree in all enterprises, including in the process, discrete parts, or service industries.

As previously mentioned, the coordinator used in the method 600 may use any combination of global or local relaxed, reduced, restricted, and/or rigorous models. Depending on the system, the coordinator may have detailed information about one or more of the cooperators, which could indicate that those cooperators' constraints are essentially public. In these cases, it may not be necessary to include those cooperators explicitly as sub-problems in the method 600 since the pole offers that are made by the coordinator may always be feasible with respect to the cooperators that only contain public constraints. This introduces a significant amount of flexibility in handling decomposed systems since there is more freedom to manage the trade-off between the computational complexity of solving a single global rigorous model and the several iterations resulting from the decomposition of the system into multiple local rigorous models.

Illustrations of the joint feasibility regions of the coordinator and cooperators are shown using dashed and full lines, respectively, in FIGS. 10A through 10D. If using a global rigorous model as a coordinator (FIG. 10A), the pole offers that are calculated by the coordinator are always feasible for all cooperators, and the method 600 converges in a single iteration. If the coordinator is partially rigorous or restricted (FIG. 10B), it contains the entire feasible solution of a sub-section of a decision-making system (such as the second cooperator). In this case, explicitly including the second cooperator as an element in the cooperation layer is optional since all pole offers from the coordinator are feasible for the second cooperator. If the coordinator is a global reduced model (FIG. 10C), it does not include part of the joint feasible solution space of the cooperation layer. When a feasible set of the coordinator model contains the feasible sets of all cooperators (FIG. 10D), the coordinator is a global relaxed problem, and the coordination is feasible when all cooperators are feasible.

Figure 11:
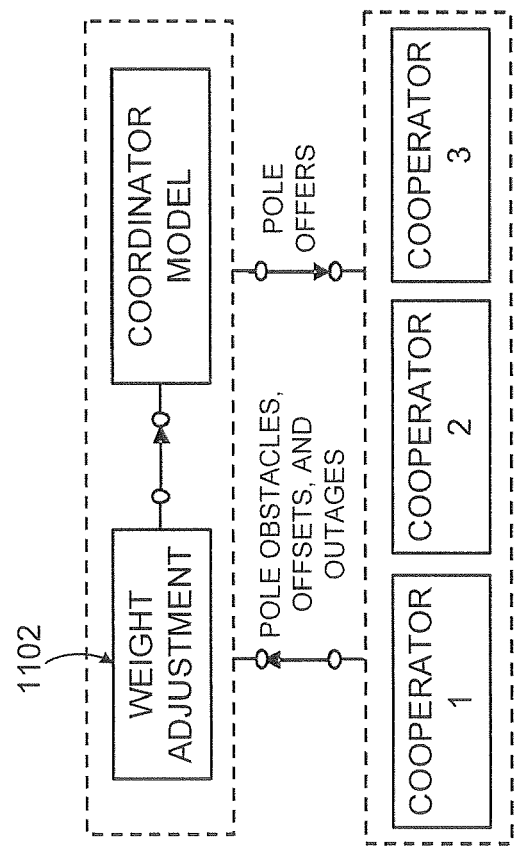
Figure 10A:
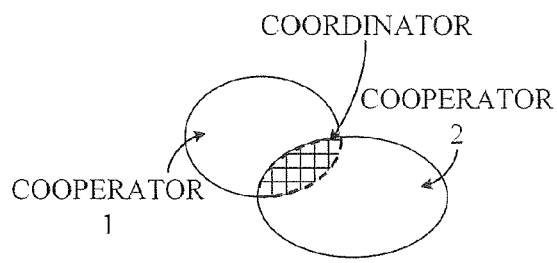
Figure 10B:
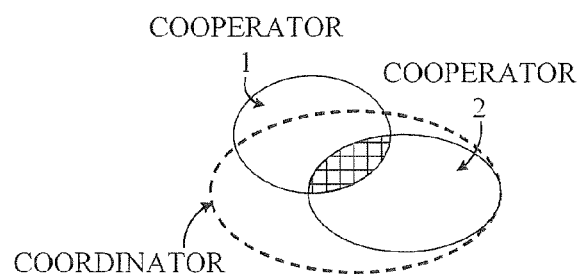
Figure 10C:
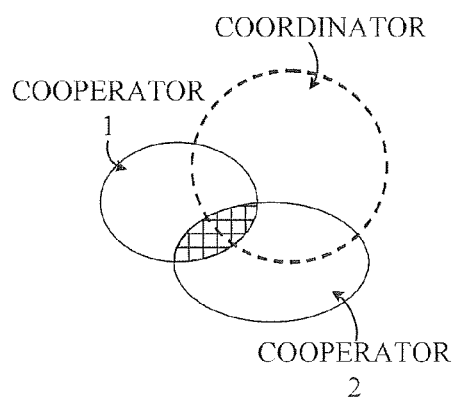
Figure 10D:
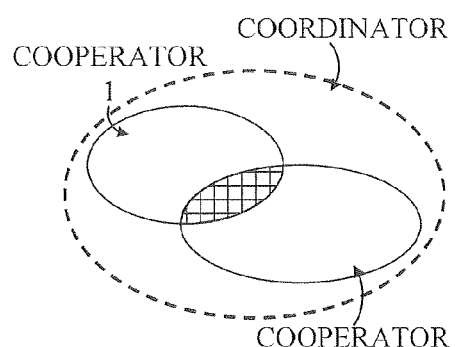

As noted above, the method 600 shown in FIG. 6 can be used to obtain globally feasible solutions to a problem being solved. This technique could be used independently when, for example, any globally feasible solution is equally valuable to the decision-making system. This technique could also be embedded in a global optimization framework (such as Lagrangean decomposition) and used to obtain a globally feasible lower bound for a maximization problem at each iteration of the framework. FIG. 11 illustrates how the hierarchical decomposition 200 can be expressed in a general decomposition framework. Here, a weight adjustment component 1102 is used in the coordination layer 202 to adjust the objective function weights for the coordinator. This could occur, for example, when the HDH application 154 is performing steps 618-622 in FIG. 6.

FIGS. 12 through 18 illustrate the application of the method 600 to an industrial off-site and on-site storage and handling system. Three different decomposition strategies are applied in this example. These include (i) a coordinated strategy using a relaxed coordinator model, (ii) a coordinated strategy using a restricted or partially rigorous model, and (iii) a collaborative strategy. The results are compared with a centralized decision-making strategy for solving a global rigorous coordinator model.

Figure 12:
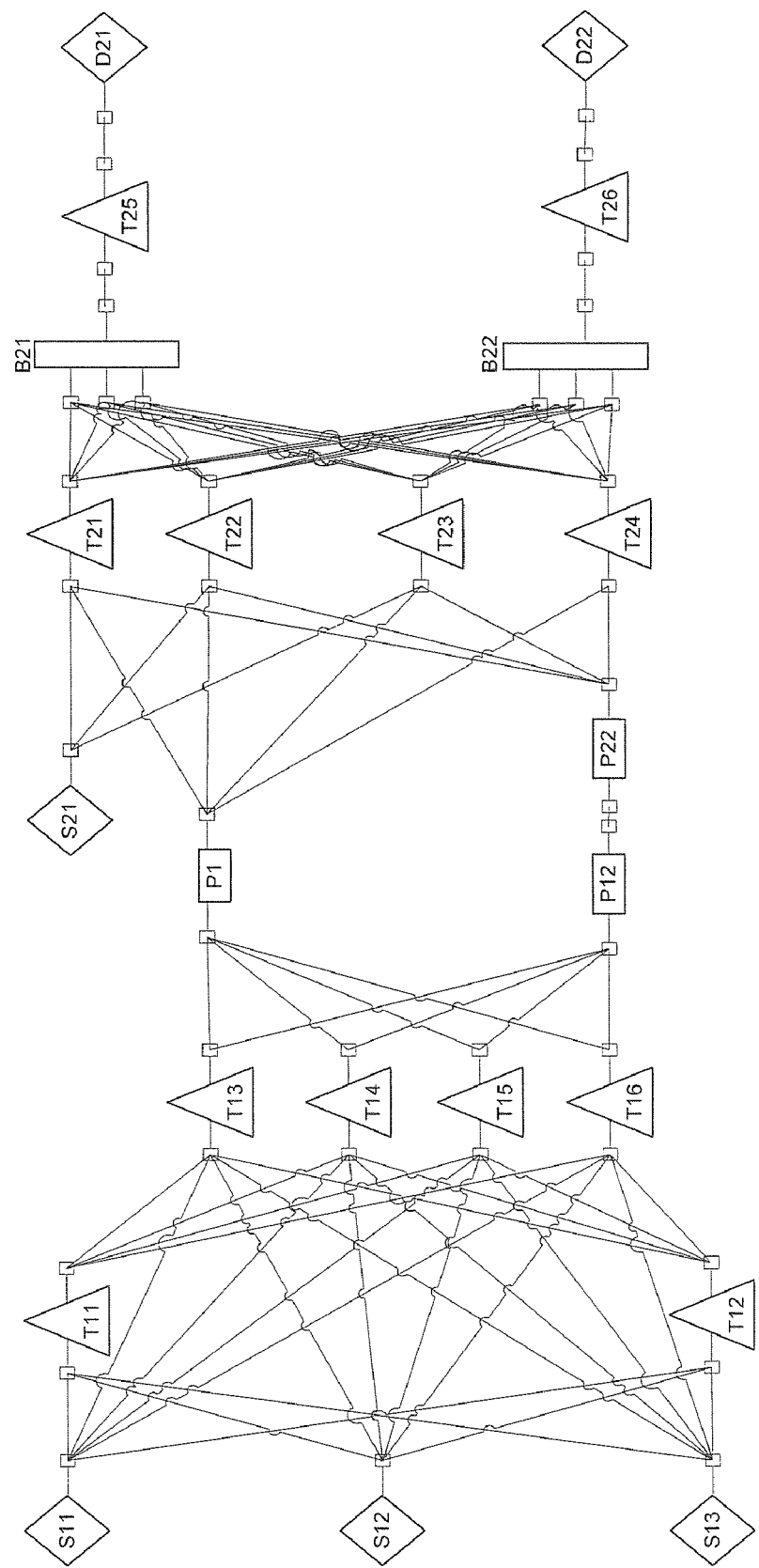
Figure 13:
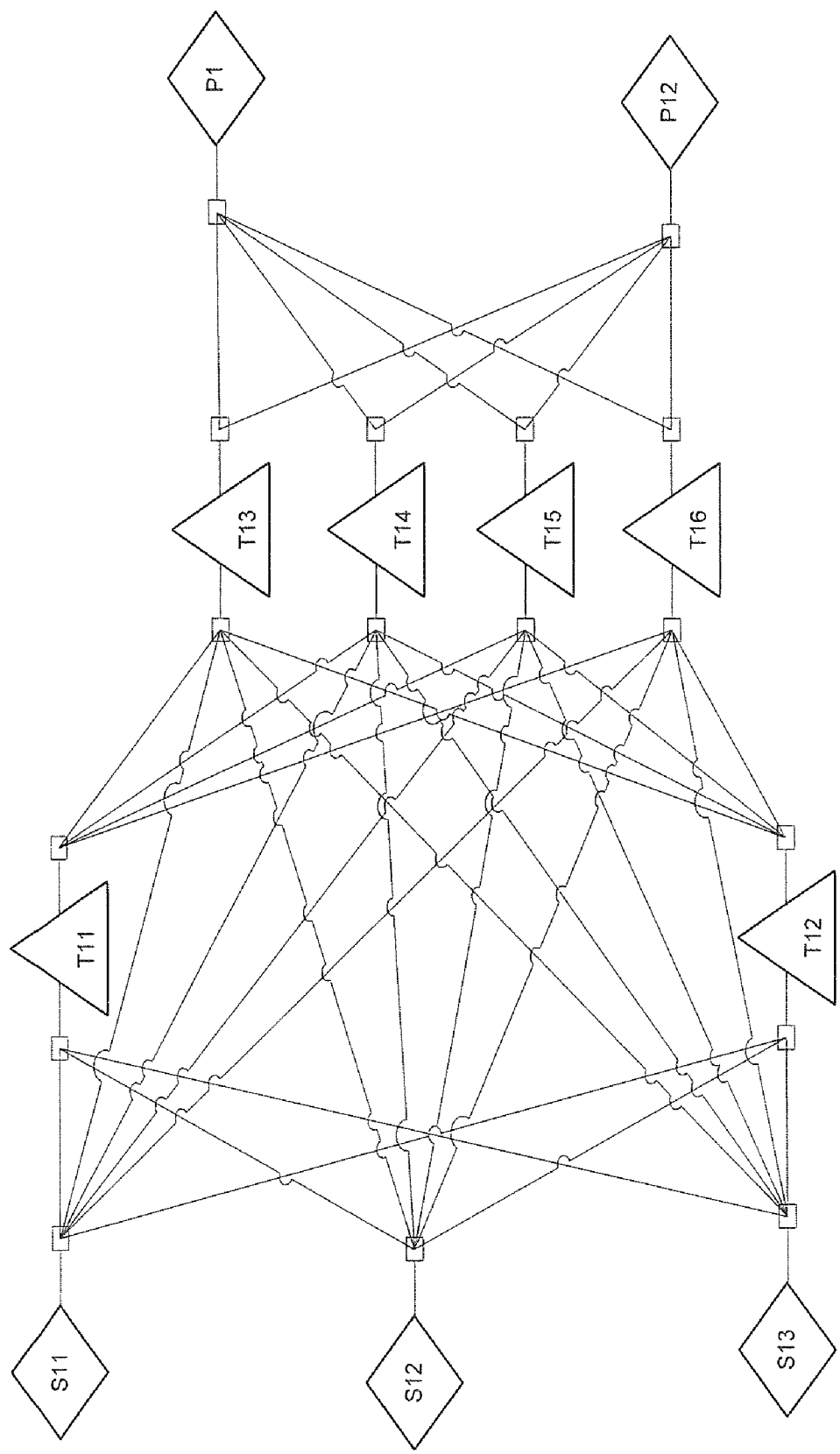

The layout and connectivity of off-site and on-site storage tanks, pumping units, and blending units at a petrochemical process industry are shown in FIG. 12. In FIG. 12, the diamonds represent perimeter units through which material enters or leaves the system. Triangles represent pool units that can store material for indefinite amounts of time. Rectangles represent pipeline units and continuous process units (such as blenders). This system is modeled under the unit-operation-port-state superstructure (UOPSS) and the quantity-logic quality paradigm (QLQP) using logistics inventory modeling details. Material arrives at the off-site terminal tanks through three supply perimeter units (S11, S12, and S13) and is directed to one of six pool units (T11-T16). The material is taken through one of two pipeline-units (P1 or P12) to the on-site facilities. After storage in pool units (T23-T24), the material is blended in the blending process units (B21 and B22), stored in pool units (T25-T26), and sent to one of two demand perimeter units (D21-D22).

In a scheduling problem, the objective function is to maximize profit, which in this case is only a function of D21 and D22 (such as $10 for every kilo-metric ton of material allocated to a demand perimeter unit D21 or D22). In other words, in this example, there are no costs associated with S11, S12, S13, and S21, which is not unreasonable when feedstock is supplied at fixed amounts according to a fixed delivery schedule. The scheduling horizon in this example is eight days, with 24-hour time period durations.

Figure 14:
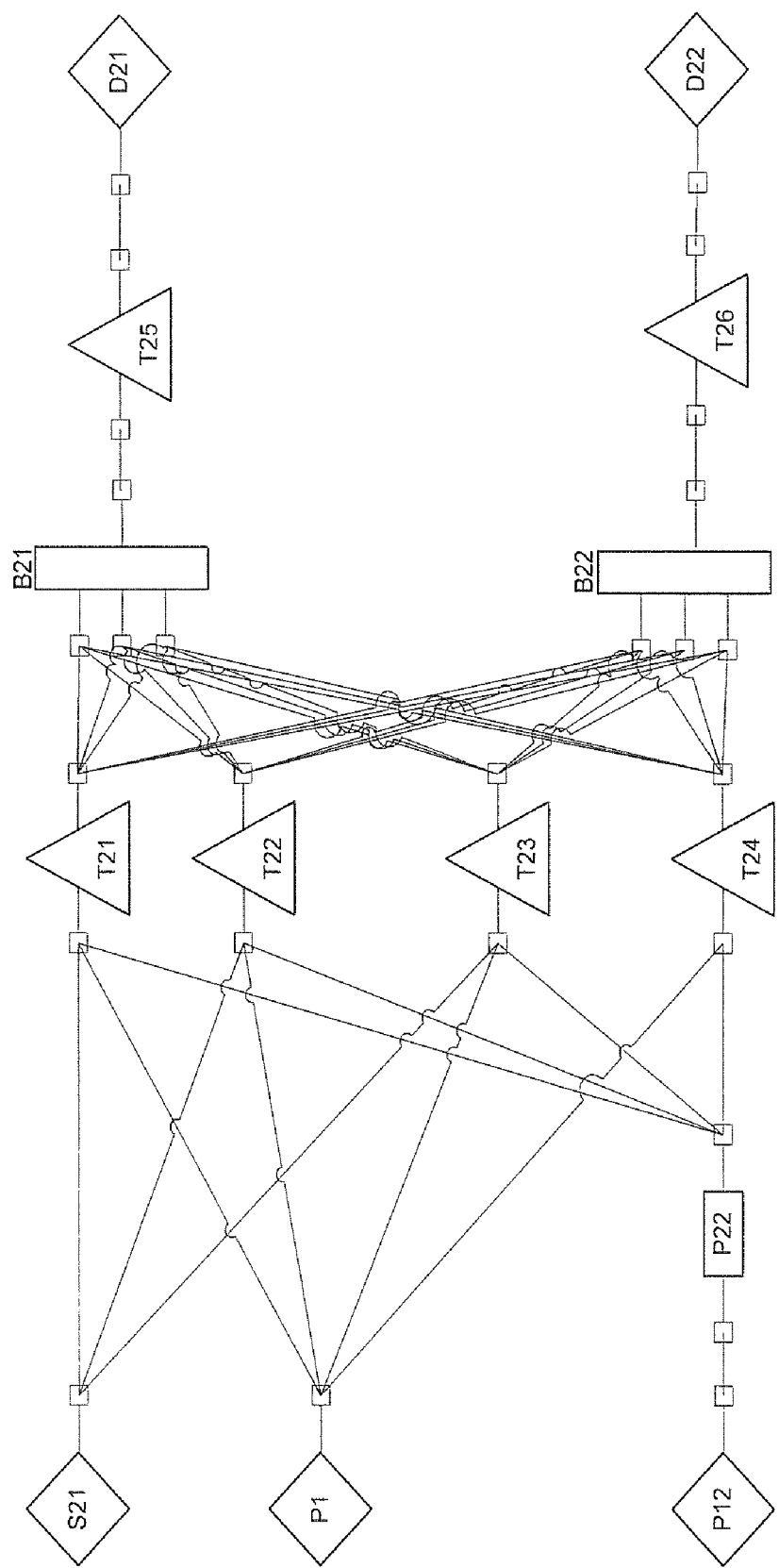

The system in FIG. 12 can be naturally decomposed into the off-site area (shown in FIG. 13) and the on-site area (shown in FIG. 14). This example demonstrates two different strategies for handling resource protocols between cooperators (no regulation or register protocols are used in this example). The first strategy is to decompose the resource protocol across a unit, which is done on the pipeline unit P1. The second strategy is to decompose the system across a connection between units (between P12 and the pool units T21-T24 in this example), which involves the modeling of a hypothetical process unit (P22) that does not exist physically in the multi-site system.

FIGS. 15A through 15D illustrate a centralized (non-decomposed) approach, as well as three different decomposition strategies: a collaborative strategy and two coordinated strategies using a relaxed and a partially rigorous coordinator model. The centralized approach (FIG. 15A) implies that the coordinator is a global rigorous model, so the method 600 could be guaranteed to converge in a single iteration (although it may take an unreasonable amount time to solve) Since all pole offers are feasible for the cooperators, it is not necessary to include the cooperators explicitly in the algorithm.

In the collaborative strategy (FIG. 15B), no information other than the resource poles is shared across the collaborators. This strategy can be easily used in the HDH application 154 by modeling a coordinator that has perfect knowledge about the constraints at the on-site area (the second cooperator) but no knowledge about the off-site area. The coordinator can therefore be interpreted as a local rigorous model of the on-site area only.

In the coordinated strategy with a relaxed coordinator (FIG. 15C), each cooperator is only willing to share its connectivity information (such as their number of units and their pumping interconnections) and the upper bounds on the pool unit lot-sizes. No additional operational logic details, such as settling times or lower bounds on pool unit lot-sizes, are provided. The coordinated strategy using a partially rigorous coordinator model (FIG. 15D) may contain all of the rigorous model information for the second cooperator and only the connectivity information of the first cooperator in the coordination layer. Since the rigorous model for the second cooperator exists within the coordinator, it may not be necessary to include this cooperator explicitly in the HDH application 154 since all of the pole offers may necessarily be feasible for the second cooperator and no feedback is required.

The details of the modeling in this particular example are provided below in Tables 1 through 9.

TABLE 1

(Model Parameters - Cooperator 1)

| Pools | Lot-Size (kMT) | | SDWB (kMT) | FDD (h) |
|---|---|---|---|---|
| | LB ($XH_{pl}^{min}$) | UB ($XH_{pl}^{max}$) | ($XH_{pl}^{SUWB}$) | ($\tau_{FDD,pl}^{min}$) |
| T11 | 0 | 9 | 0 | 0 |
| T12 | 0 | 4.2 | 0 | 0 |
| T13 | 2 | 12.5 | 4 | — |
| T14 | 2 | 12.7 | 4.05 | 0 |
| T15 | 2 | 18.5 | 5.35 | 0 |
| T16 | 2 | 18.5 | 6.6 | 0 |

TABLE 2

(Model Parameters - Cooperator 2)

| Pools | Lot-Size (kMT) | | SDWB (kMT) | FDD (h) | Continuous Process | Charge Size (kMT/hr) | |
|---|---|---|---|---|---|---|---|
| | LB ($XH_{pl}^{min}$) | UB ($XH_{pl}^{max}$) | ($XH_{pl}^{SUWB}$) | ($\tau_{FDD,pl}^{min}$) | | LB | UP |
| T11 | 1 | 6.2 | — | — | B21 | 0.1 | 0.28 |
| T12 | 1 | 6.2 | — | — | B22 | 0.1 | 0.3 |
| T13 | 1 | 6.2 | 1.5 | — | P1 | 0.25 | 0.32 |
| T14 | 0 | 3.9 | 0 | — | P22 | 0.25 | 0.35 |
| T15 | 0 | 0.35 | — | — | | | |
| T16 | 0 | 0.35 | — | — | | | |

TABLE 3

(Model Parameters - Relaxed Coordinator)

| | Lot-Size (kMT) | | SDWB | FDD (h) | Continuous | Charge Size (kMT/hr) | |
|---|---|---|---|---|---|---|---|
| Pools | LB ($XH_{pl}^{min}$) | UB ($XH_{pl}^{max}$) | (kMT) ($XH_{pl}^{SUWB}$) | ($\tau_{FDD,pl}^{min}$) | Process | LB | UP |
| T11 | 0 | 9 | — | — | B21 | 0.1 | 0.28 |
| T12 | 0 | 4.2 | — | — | B22 | 0.1 | 0.3 |
| T13 | 0 | 12.5 | — | — | P1 | 0.25 | 0.32 |
| T14 | 0 | 12.7 | — | — | P22 | 0.25 | 0.35 |
| T15 | 0 | 18.5 | — | — | | | |
| T16 | 0 | 18.5 | — | — | | | |
| T21 | 0 | 6.2 | — | — | | | |
| T22 | 0 | 6.2 | — | — | | | |
| T23 | 0 | 6.2 | — | — | | | |
| T24 | 0 | 3.9 | — | — | | | |
| T25 | 0 | 0.35 | — | — | | | |
| T26 | 0 | 0.35 | — | — | | | |

TABLE 4

(Model Parameters - Partially Rigorous Coordinator)

| | Lot-Size (kMT) | | SDWB | FDD (h) | Continuous | Charge Size (kMT/hr) | |
|---|---|---|---|---|---|---|---|
| Pools | LB ($XH_{pl}^{min}$) | UB ($XH_{pl}^{max}$) | (kMT) ($XH_{pl}^{SUWB}$) | ($\tau_{FDD,pl}^{min}$) | Process | LB | UP |
| T11 | 0 | 9 | — | — | B21 | 0.1 | 0.28 |
| T12 | 0 | 4.2 | — | — | B22 | 0.1 | 0.3 |
| T13 | 0 | 12.5 | — | — | P1 | 0.25 | 0.32 |
| T14 | 0 | 12.7 | — | — | P22 | 0.25 | 0.35 |
| T15 | 0 | 18.5 | — | — | | | |
| T16 | 0 | 18.5 | — | — | | | |
| T21 | 1 | 6.2 | — | — | | | |
| T22 | 1 | 6.2 | — | — | | | |
| T23 | 1 | 6.2 | 1.5 | — | | | |
| T24 | 0 | 3.9 | 0 | — | | | |
| T25 | 0 | 0.35 | — | — | | | |
| T26 | 0 | 0.35 | — | — | | | |

TABLE 5

(Model parameters - Semi-continuous flow constraints on outlet-ports)

| Source-Port | Mode-Operation | Flows (kMT/h) LB | UB |
|---|---|---|---|
| S11 | A, B, C | 0.04 | 0.35 |
| S12 | A, B, C | 0.02 | 0.45 |
| S13 | A, B, C | 0 | 2 |
| S21 | A, B, C | 0 | 0.25 |
| T11 | A, B, C | 0 | 1.5 |
| T12 | A, B, C | 0 | 1.5 |
| T13 | A, B, C | 0 | 1.5 |
| T14 | A, B, C | 0 | 1.5 |
| T15 | A, B, C | 0 | 1.5 |
| T16 | A, B, C | 0 | 1.5 |
| T21 | A, B, C | 0 | 0.28 |
| T22 | A, B, C | 0 | 0.28 |
| T23 | A, B, C | 0 | 0.28 |
| T24 | A, B, C | 0 | 0.38 |
| T25 | ABC | 0 | 0.28 |
| T26 | ABC | 0 | 0.3 |
| B21 | ABC | 0 | 0.28 |
| B22 | ABC | 0 | 0.3 |
| P1 | A, B, C | 0 | 0.25 |
| P12 | A, B, C | 0 | 0.35 |
| P22 | A, B, C | — | — |

TABLE 6

(Model parameters - Semi-continuous flow constraints on inlet-ports)

| Destination-Port | Mode-Operation | Flows (kMT/h) LB | UB |
|---|---|---|---|
| D21 | ABC | 0.06 | 0.28 |
| D22 | ABC | 0.078 | 0.3 |
| T11 | A, B, C | 0 | 2 |
| T12 | A, B, C | 0 | 2 |
| T13 | A, B, C | 0 | 2 |

TABLE 6-continued (Model parameters - Semi-continuous flow constraints on inlet-ports)

| | | Flows (kMT/h) | |
|---|---|---|---|
| Destination-Port | Mode-Operation | LB | UB |
| T14 | A, B, C | 0 | 2 |
| T15 | A, B, C | 0 | 2 |
| T16 | A, B, C | 0 | 2 |
| T21 | A, B, C | 0 | 0.28 |
| T22 | A, B, C | 0 | 0.28 |
| T23 | A, B, C | 0 | 0.28 |
| T24 | A, B, C | 0 | 0.15 |
| T25 | ABC | 0 | 0.28 |
| T26 | ABC | 0 | 0.3 |
| B21 | A, B, C | 0 | 0.28 |
| B22 | A, B, C | 0 | 0.29 |
| P1 | A, B, C | 0 | 0.35 |
| P12 | A, B, C | 0 | 0.35 |
| P22 | A, B, C | — | — |

TABLE 7

(Initial lot-sizes for pool units)

| Pool Units | Initial Lot-Size (kMT) | Initial Material |
|---|---|---|
| T11 | 0 | B |
| T12 | 0 | B |
| T13 | 10.579 | A (cooperators) |
| T14 | 12.675 | B |
| T15 | 18.051 | B |
| T16 | 2.484 | B |
| T21 | 5.251 | A |
| T22 | 5.52 | B |
| T23 | 5.608 | B |
| T24 | 0 | B |
| T25 | 0 | ABC |
| T26 | 0 | ABC |

TABLE 8

(Inverse-yield orders for blender process units)

| Blender-Unit | Inlet-Port | Start-Time (h) | End-Time (h) | Inverse-Yield LB | Inverse-Yield UB |
|---|---|---|---|---|---|
| B21 | A | 0 | 24 | 0 | 0 |
| | | 24 | 48 | 0.95 | 1 |
| | | 48 | 192 | 0 | 0 |
| | B | 0 | 24 | 0.95 | 1 |
| | | 24 | 48 | 0 | 0 |
| | | 48 | 192 | 0.95 | 1 |
| | | 0 | 192 | 0 | 0 |
| | C | 0 | 192 | 0 | 0 |
| B22 | A | 0 | 24 | 0.01781 | 0.01968 |
| | | 24 | 48 | 0.10124 | 0.11189 |
| | | 48 | 72 | 0.2804 | 0.30992 |
| | | 72 | 120 | 0 | 0 |
| | | 120 | 144 | 0.8282 | 0.91538 |
| | | 144 | 168 | 0.40206 | 0.44439 |
| | | 168 | 192 | 0 | 0 |
| | B | 0 | 24 | 0.93219 | 1 |
| | | 24 | 48 | 0.84877 | 0.93811 |
| | | 48 | 72 | 0.6696 | 0.74008 |
| | | 72 | 120 | 0.95 | 1 |
| | | 120 | 144 | 0.1218 | 0.13462 |
| | | 144 | 168 | 0.54794 | 0.60561 |
| | | 168 | 192 | 0.95 | 1 |
| | C | 0 | 192 | 0 | 0 |

TABLE 9

(Supply profile for the scheduling horizon)

| Supply Perimeter-Unit (Mode) | Start-Time (h) | End-Time (h) | Rates (kMT/h) LB | Rates (kMT/h) UB |
|---|---|---|---|---|
| S11 (A) | 48 | 164 | 0.1219 | 0.1219 |
| S12 (B) | 128 | 152 | 0.375 | 0.375 |
| | 152 | 168 | 0.3125 | 0.3125 |
| | 168 | 192 | 0.375 | 0.375 |
| S13 (B) | 78 | 96 | 1.47222 | 1.47222 |
| | 126 | 138 | 0.41667 | 0.41667 |
| S21 (B) | 25 | 72 | 0.20426 | 0.20426 |
| | 121 | 148 | 0.22833 | 0.22833 |
| | 170 | 180 | 0.2055 | 0.2055 |

It may be noted that, for this illustrative example, only conflict resolution and consensus reconciliation coordinated reasoning tactics are applied. Continuous refinement and challenge research are not used since there are no available higher- or upper-level objectives or targets for the resource protocols. As a result, only the greedy-constructive elements of the method 600 are presented in this example, and the local-improvement elements (continuous refinement and challenge research) are excluded.

In Tables 1 through 4, shut-down-when-below (SDWB) refers to logistics constraints (involving both quantity and logic variables) that allow the shut-down of an operation-mode only when below a certain threshold value. The SDWE constraint can be modeled as follows:

$$xh_{pp,t-1} - XH_{p1}^{SDWB} - XH_{p1}^{max} + XH_{p1}^{max} \cdot (y_{p1,t-1} - y_{p1,t}) \leq 0, \forall p1=1 \ldots NPL \text{ and } t=1 \ldots NT. \quad (10)$$

Here, $xh_{pp,t}$ represents the hold-up of physical unit pp at time-period t, and $y_{p1,t}$ represents the logic variable for the set-up of logical unit p1 at time-period t. Also, $XH_{p1}^{max}$ represents the maximum hold-up or inventory of logical unit p1, and $XH_{p1}^{SUWB}$ represents the start-up-when-below lot-size of logical pool unit p1.

The fill-draw delay (FDD) constraint in Tables 1 through 4 represents the timing between the last filling sub-operation and the following drawing sub-operation. An FDD of zero indicates a standing-gauge pool unit. In the following constraints, i and j respectively represent the specific inlet-ports and outlet-ports attached to the units that are downstream and upstream of the logical pool unit. The ip1 and jp1 subscripts denote the inlet-port and outlet-port on the logical pool unit itself. The FDD constraint can be modeled as follows:

$$y_{jp1,jin,t+tt} + y_{jout,ip1,t} \leq 1, \forall tt=0 \ldots \tau_{FDD,p1}^{min}, t=1 \ldots NT|t+tt \leq NT. \quad (11)$$

Equation (11) specifies that a draw cannot occur until after the lower FDD elapses. There is also an upper bound on FDD, which indicates the maximum duration between the last filling and the following drawing of stock out of the logical pool unit, which can be modeled as follows:

$$y_{jout,ip1,i} - \sum_{tt=1}^{\tau_{FDD,pl}^{max}} y_{jp1,jin,t+tt} \leq 0, \quad (12)$$

$$\forall t = 1 \ldots NT - \tau_{FDD,pl}^{max} | t + tt \leq NT.$$

In Tables 5 through 9, additional quantity, logic, and logistics details are presented. Tables 5 and 6 respectively provide semi-continuous flow logistics constraints for the outlet-ports and inlet-ports, which model flows that can be zero or between their lower and upper bounds within a time-period. Table 7 shows the opening inventories, hold-ups, or initial lot-size amounts in the pool units at the start of a schedule, with initial mode-operation logic setups for whether the pool unit is in material operation or service A, B, C, or ABC. The material balance for the pool units can be expressed as:

$$xh_{pp,t} = xh_{pp,t-1} + xf_{jin,t} - xf_{jout,t} \quad \forall \ t=1 \ldots NT \quad (13)$$

where $xf_{jin,t}$ and $xf_{jout,t}$ represent the flows entering and leaving physical unit pp at time-period t, respectively. Table 8 specifies the timing of what is called inverse-yield orders, which represent recipe, intensity, or proportion amounts of how much of stocks A, B, and C should be mixed together in the blending process units (these are often specified by a higher-level planning system). Table 9 shows the supply amounts of A, B, and C from the supply perimeter units over the scheduling horizon.

For each of the three decomposition strategies mentioned above and shown in FIGS. 15B through 15D, two different demand scenarios are applied. One is an aggressive scenario, where all demands are fixed (such as when the lower and upper bounds are equal) (see Table 10). Another is a conservative scenario, where the demands have lower bounds of zero (see Table 11).

TABLE 10

(Demand profile for the scheduling horizon - aggressive approach)

| Demand Perimeter- | Start- | End- | Rates (kMT/h) | |
|---|---|---|---|---|
| Unit (Mode) | Time (h) | Time (h) | LB | UB |
| D21 | 0 | 48 | 0.18353 | 0.18353 |
| (ABC) | 48 | 72 | 0.18345 | 0.18345 |
|  | 72 | 96 | 0.18353 | 0.18353 |
|  | 96 | 120 | 0.18087 | 0.18087 |
|  | 120 | 144 | 0.18353 | 0.18353 |
|  | 144 | 168 | 0.20156 | 0.20156 |
|  | 168 | 192 | 0.18353 | 0.18353 |
| D22 | 0 | 24 | 0.28546 | 0.28546 |
| (ABC) | 24 | 48 | 0.28061 | 0.28061 |
|  | 48 | 72 | 0.28372 | 0.28372 |
|  | 72 | 96 | 0.27328 | 0.27328 |
|  | 96 | 120 | 0.27465 | 0.27465 |
|  | 120 | 144 | 0.27525 | 0.27525 |
|  | 144 | 168 | 0.27639 | 0.27639 |
|  | 168 | 192 | 0.26302 | 0.26302 |

TABLE 11

(Demand profile for the scheduling horizon - conservative approach)

| Demand Perimeter- | Start- | End- | Rates (kMT/h) | |
|---|---|---|---|---|
| Unit (Mode) | Time (h) | Time (h) | LB | UB |
| D21 | 0 | 48 | 0 | 0.18353 |
| (ABC) | 48 | 72 | 0 | 0.18345 |
|  | 72 | 96 | 0 | 0.18353 |
|  | 96 | 120 | 0 | 0.18087 |
|  | 120 | 144 | 0 | 0.18353 |
|  | 144 | 168 | 0 | 0.20156 |
|  | 168 | 192 | 0 | 0.18353 |
| D22 | 0 | 24 | 0 | 0.28546 |
| (ABC) | 24 | 48 | 0 | 0.28061 |
|  | 48 | 72 | 0 | 0.28372 |
|  | 72 | 96 | 0 | 0.27328 |

TABLE 11-continued (Demand profile for the scheduling horizon - conservative approach)

| Demand Perimeter- | Start- | End- | Rates (kMT/h) | |
|---|---|---|---|---|
| Unit (Mode) | Time (h) | Time (h) | LB | UB |
|  | 96 | 120 | 0 | 0.27465 |
|  | 120 | 144 | 0 | 0.27525 |
|  | 144 | 168 | 0 | 0.27639 |
|  | 168 | 192 | 0 | 0.26302 |

Table 12 displays the problem statistics, which were generated and solved using XPRESS-MOSEL version 1.6.3 and XPRESS-MILP version 17.10.08 with all default settings. This XPRESS-MOSEL version uses XPRESS-MOSEL-PARALLEL, which provides the ability to solve problems simultaneously on different CPUs. In order to limit computation times, the maximum time on any individual optimization problem (coordinator and cooperators) is limited to either 30 "CPU seconds" or the time to find the first integer feasible solution (whichever is longer).

TABLE 12

(Problem statistics, with pre-solved values in brackets).

| Model | Constraints | Continuous Variables | Non-Zero Coefficients | Binary Variables |
|---|---|---|---|---|
| Global rigorous coordinator | 7234 (3010) | 4450 (2187) | 29780 (9484) | 1170 (951) |
| Global partially rigorous coordinator | 6809 (3134) | 4450 (2406) | 28056 (9996) | 1170 (1045) |
| Global relaxes coordinator | 6786 (2771) | 4423 (2194) | 27731 (8659) | 1154 (923) |
| Local rigorous on-sites | 3133 (1287) | 2228 (1013) | 12971 (4383) | 607 (394) |
| Local rigorous off-sites | 3598 (280) | 1991 (266) | 13314 (939) | 488 (56) |

Figure 15A:
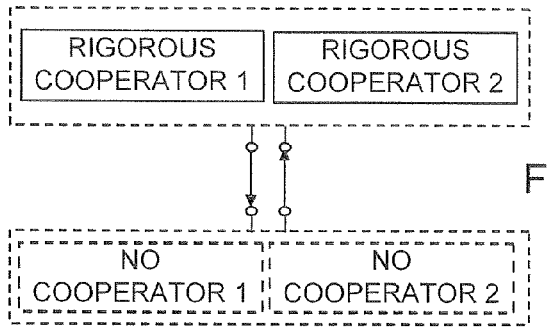
Figure 15B:
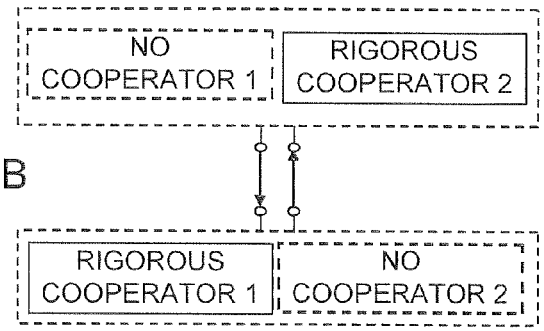
Figure 16:
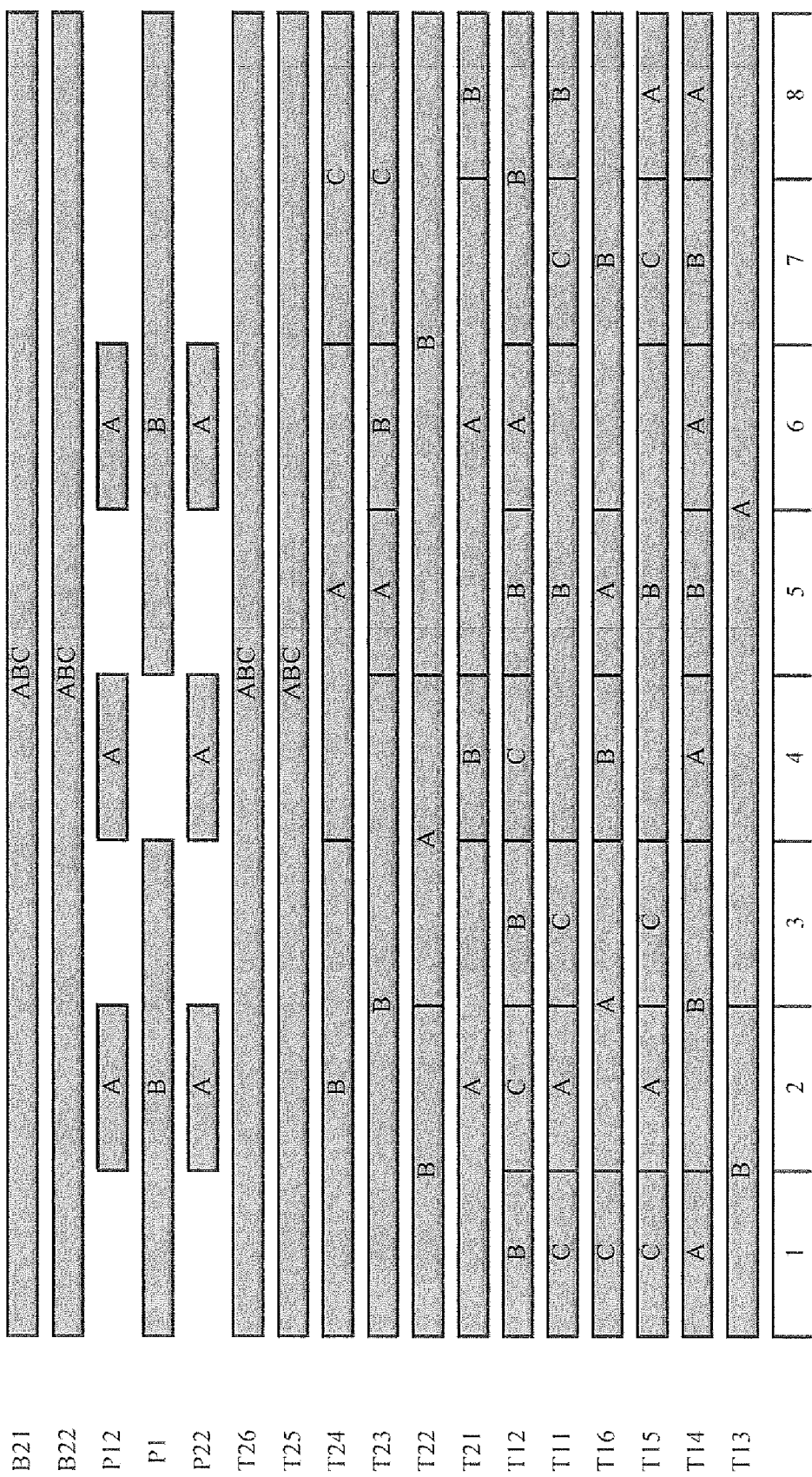
Figure 17:
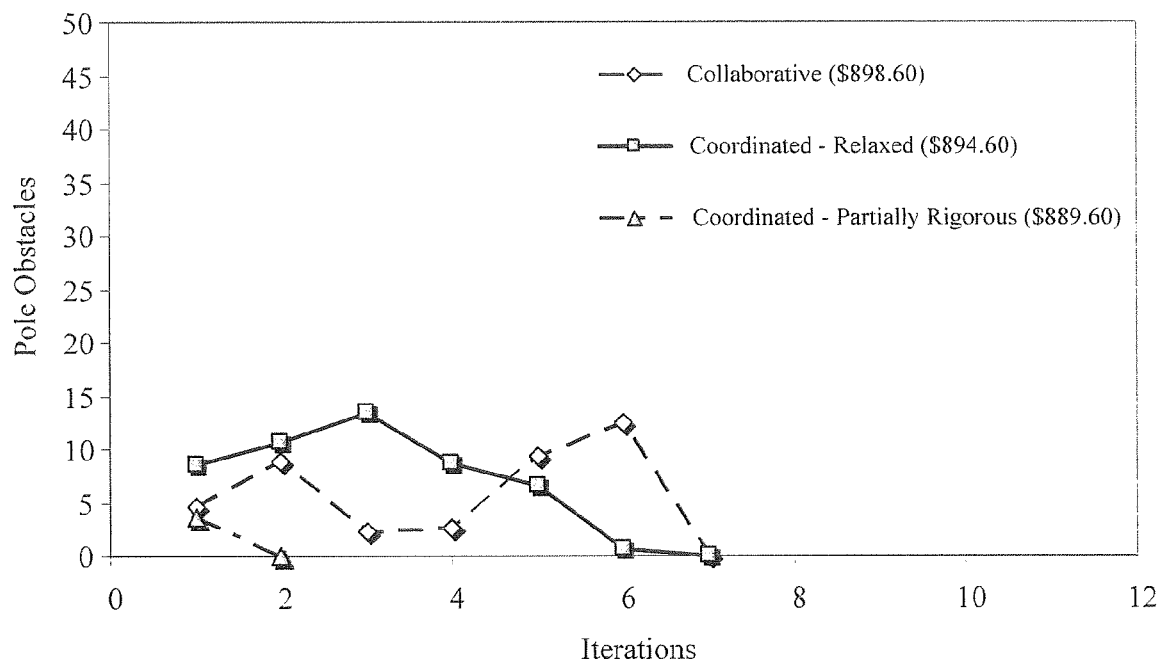
Figure 18:
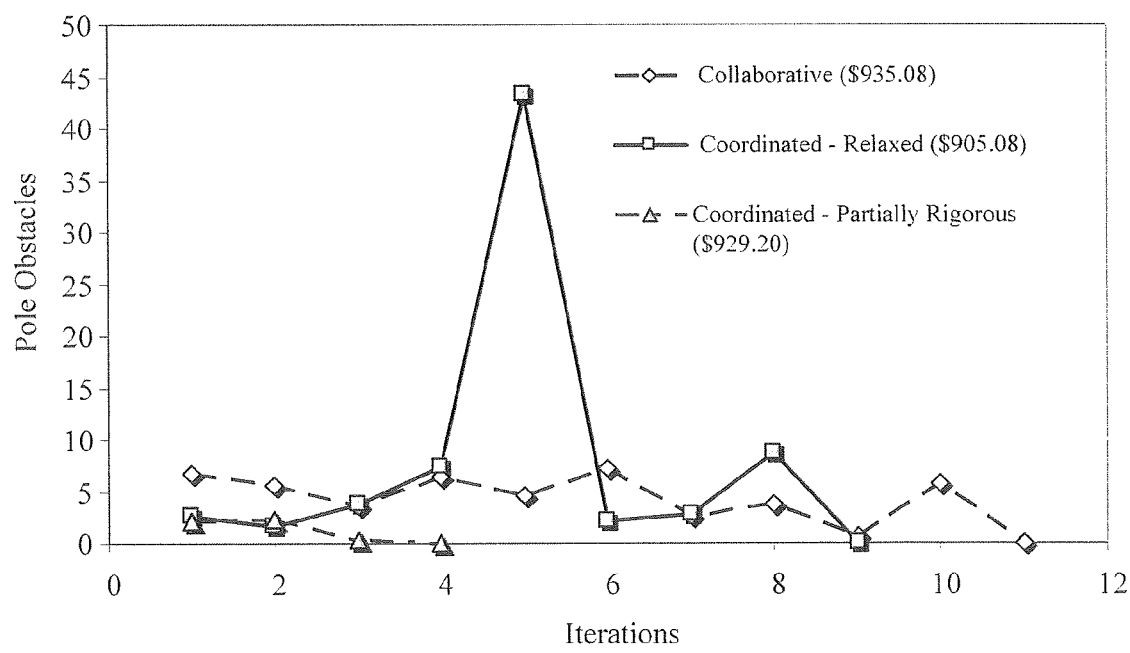

FIG. 16 illustrates a Gantt chart with the operation modes of units throughout the scheduling horizon for the solution from the centralized strategy (FIG. 15A). The conservative scenario allows the non-fulfillment of orders since the lower bounds on the demands are zero, allowing for an easier scheduling problem from a schedule feasibility perspective. This statement is confirmed by the results in Table 13 (aggressive scenario) and Table 14 (conservative scenario). As expected, the decomposition strategies in the conservative scenario (see FIG. 17) have a faster convergence time since fewer iterations are needed, compared to the aggressive scenario (see FIG. 18). On the other hand, the overall objective function is higher in the aggressive scenario since all demands have to be fully satisfied in the aggressive scenario.

TABLE 13

(Results for the aggressive case)

| Approach | Iterations | Time (CPU seconds) | Objective Function ($) |
|---|---|---|---|
| Centralized | 1 | 6301.0 | 935.08 |
| Collaborative | 11 | 626.2 | 935.08 |
| Coordinated-Relaxes | 9 | 401.7 | 905.08 |
| Coordinated-Partially Rigorous | 4 | 195.7 | 929.2 |

TABLE 14

(Results for the conservative case)

| Approach | Iterations | Time (CPU seconds) | Objective Function ($) |
|---|---|---|---|
| Centralized | 1 | 1488.0 | 935.08 |
| Collaborative | 7 | 386.2 | 898.6 |
| Coordinated-Relaxes | 7 | 333.6 | 894.6 |
| Coordinated-Partially Rigorous | 2 | 78.5 | 889.6 |

Figure 15C:
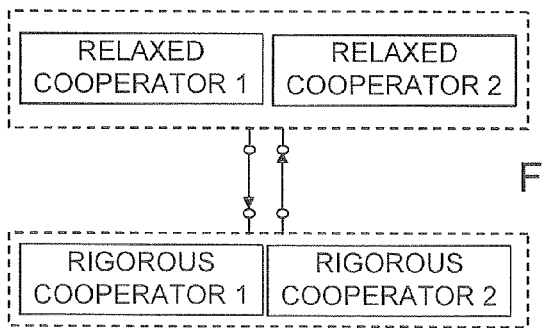
Figure 15D:
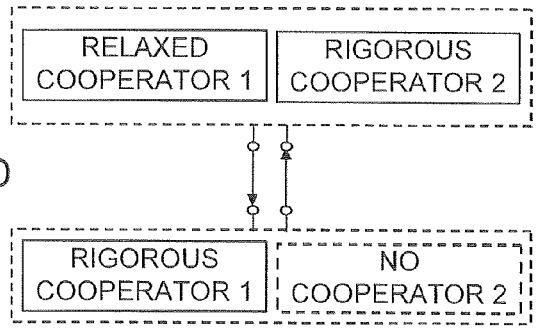

In terms of the performance of the decomposition approaches in this example, the collaborative strategy (FIG. 15B) found feasible solutions with better objective function values than the coordinated approaches (FIGS. 15C-15D). This may be partly due to the fact that the coordinator may under-estimate the performance of the cooperators, which does not occur in the collaborative strategy. In contrast, the collaborative strategy needed more iterations than the coordinated approaches in the more difficult aggressive scenario. It may again be noted that the computational performance of the coordinated strategies can be enhanced by the capability of parallelization of the cooperator sub-problems, which may not be possible with a collaborative strategy since a collaborative approach is often performed in-series or in-priority.

As previously mentioned, the collaborative strategy assumes that the on-site element ("cooperator 2") is a locally rigorous coordinator in the HDH algorithm, so decisions made by the on-site coordinator have priority over the decisions made by the off-site element ("cooperator 1"). This is aligned with the notion of scheduling the bottlenecks first. The opposite collaboration strategy was also attempted, where the off-site area was modeled as the coordinator, so its decisions had top priority. This strategy failed to find a globally feasible solution, which is explained by the fact that the off-site area does not constitute a bottleneck, nor is it the true driver of decision-making in this system. This case demonstrates that, in order to successfully apply a collaborative strategy, it may be necessary to identify the correct segmentation of the decision-making system and to identify the priority of its individual elements.

The use of a partially rigorous coordinator model significantly improved the speed of the HDH algorithm in this example. In the aggressive scenario, the partially rigorous coordination also provided a better globally feasible solution than the relaxed coordinator. The centralized strategy implies the use of a global rigorous model in the coordination layer 202. The first feasible solution took ten and four times longer than the collaborative strategy in the aggressive and conservative scenarios, respectively. In this example, the first feasible solution of the centralized system was also the global provably-optimal solution. It may be noted that the global optimum was also achieved by the collaborative strategy in the aggressive approach. This shows that while it is not guaranteed that the global optimum will be found by using the HDH algorithm, the HDH algorithm may in fact be able to obtain it.

Although the above description has described the HDH algorithm as using an error-directed technique, weight-directed enhancements to this heuristic could be used to support aggregation and disaggregation rules to automatically transform a global rigorous model into both a local rigorous model and a global relaxed/reduced/restricted model. This could reduce or minimize the model-mismatch or inaccuracies introduced by the contrast between public and private constraints. In essence, this is equivalent to using an exogenous (global rigorous) model supplied by the modeler, scheduling analyst, or other source and programmatically generating coordinator and cooperator endogenous models using "reduction rules."

In general, the HDH algorithm includes various operations that support comprehensive coordination or collaboration. These include:
 conflict resolution for resolving infeasibilities from collaborators by adjusting pole outlines or bounds in the coordinator;
 consensus reconciliation based on observations from the collaborators for "smoothing" the new pole offers calculated by the coordinator;
 continuous refinement providing continuous improvement or re-starting to find new globally feasible solutions; and
 challenge research for allowing the setting of an exogenous target for the pole offer calculated by the coordinator.

Although FIGS. 2A through 18 illustrate one example of a technique for hierarchical decomposition of planning, scheduling, and other decision-making problems, various changes may be made to FIGS. 2A through 18. For example, the hierarchical decomposition 200 in FIGS. 2 and 4 could include any number and type of coordinators and cooperators. Also, the resources shown in FIG. 5 are for illustration only. Further, while shown as a series of steps in FIG. 6, various steps in FIG. 6 could overlap, occur in parallel, occur in a different order, or occur multiple times. In addition, the example uses of the hierarchical decomposition shown in FIGS. 7 through 18 are for illustration only. The hierarchical decomposition technique could be used to solve any other or additional problems according to particular needs. Depending on the implementation, the method 600 could be automated or used in a manual framework (such as for management consulting services). The method may be applied to any type of decomposed, decentralized, distributed, or other decision-making problem, such as enterprise resource planning (ERP), strategic long-term planning, tactical short-term scheduling, real-time optimization, process control, or a combination thereof.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another.

The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
   a coordinator configured to generate a first offer representing a possible solution to a problem being solved, the coordinator configured to generate the first offer using a first model; and
   multiple cooperators each configured to receive the first offer, determine if a sub-problem associated with the problem can be solved based on the first offer and using a second model, and identify an infeasibility and communicate the infeasibility to the coordinator when the sub-problem cannot be solved based on the first offer;
   wherein the coordinator is further configured to receive the infeasibility, generate a second offer by reducing a deviation between the first offer and a consensus of the cooperators, and provide the second offer to the cooperators, the consensus of the cooperators based on a level of the first offer that each cooperator can achieve.

2. The system of claim 1, wherein the coordinator is configured to adjust one or more bounds and constraints associated with the first offer to generate the second offer.

3. The system of claim 2, wherein the constraints comprise public, private, and protected constraints.

4. The system of claim 1, wherein each of the coordinator and the cooperators comprises a model, each model comprising one of: a rigorous model, a restricted model, a relaxed model, and a reduced model.

5. The system of claim 1, wherein the first and second offers are associated with at least one of: a quantity characteristic associated with the problem, a quality characteristic associated with the problem, and logic characteristics associated with the problem.

6. The system of claim 1, wherein one of the cooperators is further configured to operate as a second coordinator, the second coordinator associated with multiple second cooperators.

7. The system of claim 1, wherein the first and second offers are associated with at least one of: a pole offer and a price offer.

8. The system of claim 1, wherein the coordinator is further configured, once a solution to the problem being solved is identified, to identify a third offer representing a different possible solution to the problem being solved.

9. The system of claim 1, wherein the coordinator is configured to generate the second offer by reducing a deviation between the first offer and a target value associated with the problem being solved.

10. The system of claim 1, wherein:
    the problem to be solved comprises a planning and scheduling problem;
    the first and second offers relate to plans for producing at least one product; and
    the sub-problems associated with the cooperators relate to scheduling production of the at least one product in accordance with the plans.

11. The system of claim 1, wherein:
    the problem to be solved comprises a process control problem;
    the first and second offers relate to one or more setpoints, the setpoints associated with one or more process variables in a process system; and
    an infeasibility from a particular one of the cooperators is based on a difference between one of the setpoints and a measured value of one of the process variables.

12. A method comprising:
    generating a first offer representing a possible solution to a problem being solved;
    communicating the first offer to multiple cooperators;
    receiving an infeasibility from at least one of the cooperators, the infeasibility identifying that the cooperator cannot solve a sub-problem based on the first offer;
    generating a second offer by reducing a deviation between the first offer and a consensus of the cooperators, the consensus of the cooperators based on a level of the first offer that each cooperator can achieve; and
    communicating the second offer to the cooperators.

13. The method of claim 12, further comprising:
    generating one or more additional offers until all of the cooperators indicate that no infeasibilities exist for one of the additional offers.

14. The method of claim 13, further comprising:
    once a solution to the problem being solved is identified, identifying a third offer representing a different possible solution to the problem being solved and communicating the third offer to the cooperators.

15. The method of claim 12, wherein generating the second offer comprises adjusting one or more bounds and constraints associated with the first offer.

16. The method of claim 12, wherein generating the second offer comprises reducing a deviation between the first offer and a target value associated with the problem being solved.

17. A method comprising:
    receiving, from a coordinator at one of multiple cooperators, a first offer representing a possible solution to a problem being solved;
    determining if a sub-problem associated with the problem can be solved based on the first offer;

identifying an infeasibility, the infeasibility indicating that the sub-problem cannot be solved based on the first offer;

communicating the infeasibility to the coordinator; and receiving a second offer from the coordinator, the second offer reducing a deviation between the first offer and a consensus of the cooperators, the consensus of the cooperators based on a level of the first offer that each cooperator can achieve.

18. The method of claim 17, further comprising:

receiving one or more additional offers until all of the cooperators indicate that no infeasibilities exist for one of the additional offers.

19. The method of claim 18, further comprising:

once a solution to the problem being solved is identified, receiving a third offer representing a different possible solution to the problem being solved from the coordinator.

20. The method of claim 17, wherein:

determining if the sub-problem can be solved comprises using a model; and the model comprises one of: a rigorous model, a restricted model, a relaxed model, and a reduced model.

\* \* \* \* \*